United States Patent
Janardhanan et al.

(10) Patent No.: US 10,936,864 B2
(45) Date of Patent: Mar. 2, 2021

(54) GRID LAYOUT DETERMINATION FROM A DOCUMENT IMAGE

(71) Applicant: Adobe Inc., San Jose, CA (US)

(72) Inventors: Vinish Janardhanan, Bangalore (IN); Priyanka Channabasappa Herur, Bengaluru (IN)

(73) Assignee: Adobe Inc., San Jose, CA (US)

( * ) Notice: Subject to any disclaimer, the term of this patent is extended or adjusted under 35 U.S.C. 154(b) by 375 days.

(21) Appl. No.: 16/005,584

(22) Filed: Jun. 11, 2018

(65) Prior Publication Data

US 2019/0377942 A1 Dec. 12, 2019

(51) Int. Cl.
*G06K 9/00* (2006.01)
*G06F 40/106* (2020.01)

(52) U.S. Cl.
CPC ........ *G06K 9/00463* (2013.01); *G06F 40/106* (2020.01)

(58) Field of Classification Search
CPC . G06K 9/00463; G06F 40/106; G06F 40/103; G06F 40/186; G06F 40/154; G06F 40/14; G06F 40/177
See application file for complete search history.

(56) References Cited

U.S. PATENT DOCUMENTS

| | | | |
|---|---|---|---|
| 5,848,186 A * | 12/1998 | Wang | G06K 9/00463 382/176 |
| 7,246,311 B2 * | 7/2007 | Bargeron | G06F 40/186 715/251 |
| 7,412,647 B2 * | 8/2008 | Sellers | G06F 40/114 715/253 |
| 7,526,719 B1 * | 4/2009 | Gopalakrishnan | G06F 16/26 715/227 |
| 8,136,032 B2 * | 3/2012 | Yamakado | G06F 40/103 715/243 |
| 9,183,006 B2 * | 11/2015 | Turcotte | G06F 9/451 |
| 9,817,794 B2 * | 11/2017 | Marseille | G06F 40/106 |
| 10,318,629 B2 * | 6/2019 | Shaw | G06F 40/106 |
| 10,360,288 B2 * | 7/2019 | Zhang | G06F 40/30 |
| 10,380,228 B2 * | 8/2019 | Lee | G06F 40/186 |
| 10,671,249 B2 * | 6/2020 | Kim | G06F 40/106 |
| 2005/0195221 A1 * | 9/2005 | Berger | G06F 3/04892 345/660 |

(Continued)

*Primary Examiner* — Xuemei G Chen
(74) *Attorney, Agent, or Firm* — FIG. 1 Patents

(57) ABSTRACT

In implementations of grid layout determination from a document image, a computing device receives a document image of a document that includes document content. The computing device implements a grid layout system that can determine feature elements of the document content in the document, and generate a node tree of bounded elements that represent relationships of the feature elements in the document, where each of the bounded elements is considered in the determination of the grid layout. The grid layout system can generate a containment model that includes the node tree of the bounded elements. The grid layout system can then determine a column layout of the columns in the document based on the containment model, which includes calculating a quantity of the columns, and also determine a row layout of the rows in the document based on the containment model, which includes calculating a quantity of the rows.

18 Claims, 17 Drawing Sheets

(56) References Cited

U.S. PATENT DOCUMENTS

| | | | |
|---|---|---|---|
| 2007/0074109 A1* | 3/2007 | Nagahara | G06F 40/103 715/210 |
| 2010/0174732 A1* | 7/2010 | Levy | G06F 40/10 707/768 |
| 2010/0218090 A1* | 8/2010 | Amit | G06F 40/103 715/247 |
| 2012/0185766 A1* | 7/2012 | Mansfield | G06F 40/131 715/246 |
| 2012/0192092 A1* | 7/2012 | Slatter | G06F 40/186 715/769 |
| 2012/0317470 A1* | 12/2012 | Dejean | G06K 9/00463 715/227 |
| 2013/0124968 A1* | 5/2013 | Dontcheva | G06F 40/106 715/234 |
| 2015/0169995 A1* | 6/2015 | Panferov | G06K 9/00463 382/182 |
| 2016/0077810 A1* | 3/2016 | Bertilsson | G06F 8/35 717/105 |
| 2017/0091152 A1* | 3/2017 | Antipa | G06F 40/106 |
| 2017/0199851 A1* | 7/2017 | Sasikumar | G06F 3/04842 |
| 2018/0181549 A1* | 6/2018 | Hileman | G06F 16/4393 |
| 2018/0276193 A1* | 9/2018 | Klein | G06F 40/171 |
| 2018/0349345 A1* | 12/2018 | Walkup | G06F 40/177 |
| 2018/0374225 A1* | 12/2018 | Edge | G06T 7/33 |
| 2019/0089193 A1* | 3/2019 | Ranjan | G09G 5/005 |
| 2019/0114308 A1* | 4/2019 | Hancock | G06F 40/106 |
| 2019/0141110 A1* | 5/2019 | Pimento | G06F 16/5854 |
| 2019/0303663 A1* | 10/2019 | Krishnapura Subbaraya | G06K 9/00449 |
| 2019/0340240 A1* | 11/2019 | Duta | G06F 40/284 |
| 2019/0354247 A1* | 11/2019 | Edmunds | G06F 3/04847 |
| 2020/0066018 A1* | 2/2020 | Maeda | G09G 5/32 |
| 2020/0089946 A1* | 3/2020 | Mallick | G06K 9/00463 |

\* cited by examiner

GRID LAYOUT DETERMINATION FROM A DOCUMENT IMAGE

BACKGROUND

Printed documents are generally designed based on a layout grid, which allows a graphic designer to maintain a visual consistency and provide structure for a design concept. The printed documents may be any type of magazine pages, flyers, book pages, reports, newspaper pages, invitations, resumes, and any other type of design documents. Generally, some of these types of documents may be designed in a layout grid with three or four columns and have evident margin spaces. A broadsheet newspaper page may be designed in a layout grid having more columns (e.g., six to nine columns), while some digital media, such as a Web page and other Web interfaces, may be designed in a layout grid having many more columns (e.g., twelve to twenty-four columns) in the grid. Typically, it is a difficult and tedious process for a graphic designer to recreate the layout grid of a printed document for use in digital media format, and maintain control over the layout by being able to manage the number of columns, rows, margins, and the spacing between the respective columns and rows.

SUMMARY

This Summary introduces features and concepts of grid layout determination from a document image, which is further described below in the Detailed Description and shown in the Figures. This Summary should not be considered to describe essential features of the claimed subject matter, nor used to determine or limit the scope of the claimed subject matter.

Aspects of grid layout determination from a document image are described. In implementations, a computing device receives a document image of a document that includes document content, such as text and graphics in a printed document. For example, a camera device may be integrated with the computing device, and captures a photo as a digital image of a printed document or any other type of physical document that has content generally laid out in a grid format on a page. The computing device implements a grid layout system that can determine the text and graphics as feature elements of the document content in the document, and then generate a node tree of bounded elements that represent relationships of the feature elements in the document.

A bounded element may be a text block or a graphic, such as a photo, an illustration, or any other type of image in the document that has a side along a column or a row in the grid layout. A bounded element may also represent a feature element of the document encompassed by another of the feature elements, in which case the encompassed feature element is disregarded. For example, a graphic in the document may also have text printed over the graphic, but since the boundaries of the graphic encompass the overlaid text, only the graphic is considered when determining the grid layout of the document.

The bounded elements are each considered in the determination of the grid layout of the rows and columns in the document. The grid layout system can generate a containment model that includes the node tree of the bounded elements, and includes size and position data for each of the bounded elements in the document. The containment model represents an organization of the bounded elements in the node tree from which a column layout of the columns is determined and from which a row layout of the rows is determined. The grid layout system is implemented to then determine the column layout of the columns in the document based on the containment model, which includes calculating a quantity of the columns in the document, and also determine a row layout of the rows in the document based on the containment model, which includes calculating a quantity of the rows in the document.

In aspects of grid layout determination from a document image, the grid layout system can determine the column layout by calculating a quantity of the columns in the document based on a horizontal space width between the columns, a column width of each of the columns, and based on the left and right margins of the document. The grid layout system can also determine the row layout by calculating a quantity of the rows in the document based on a vertical space height between the rows, a row height of each of the rows, and based on the top and bottom margins of the document.

BRIEF DESCRIPTION OF THE DRAWINGS

Implementations of grid layout determination from a document image are described with reference to the following Figures. The same numbers may be used throughout to reference similar features and components that are shown in the Figures.

DETAILED DESCRIPTION

Figure 1:
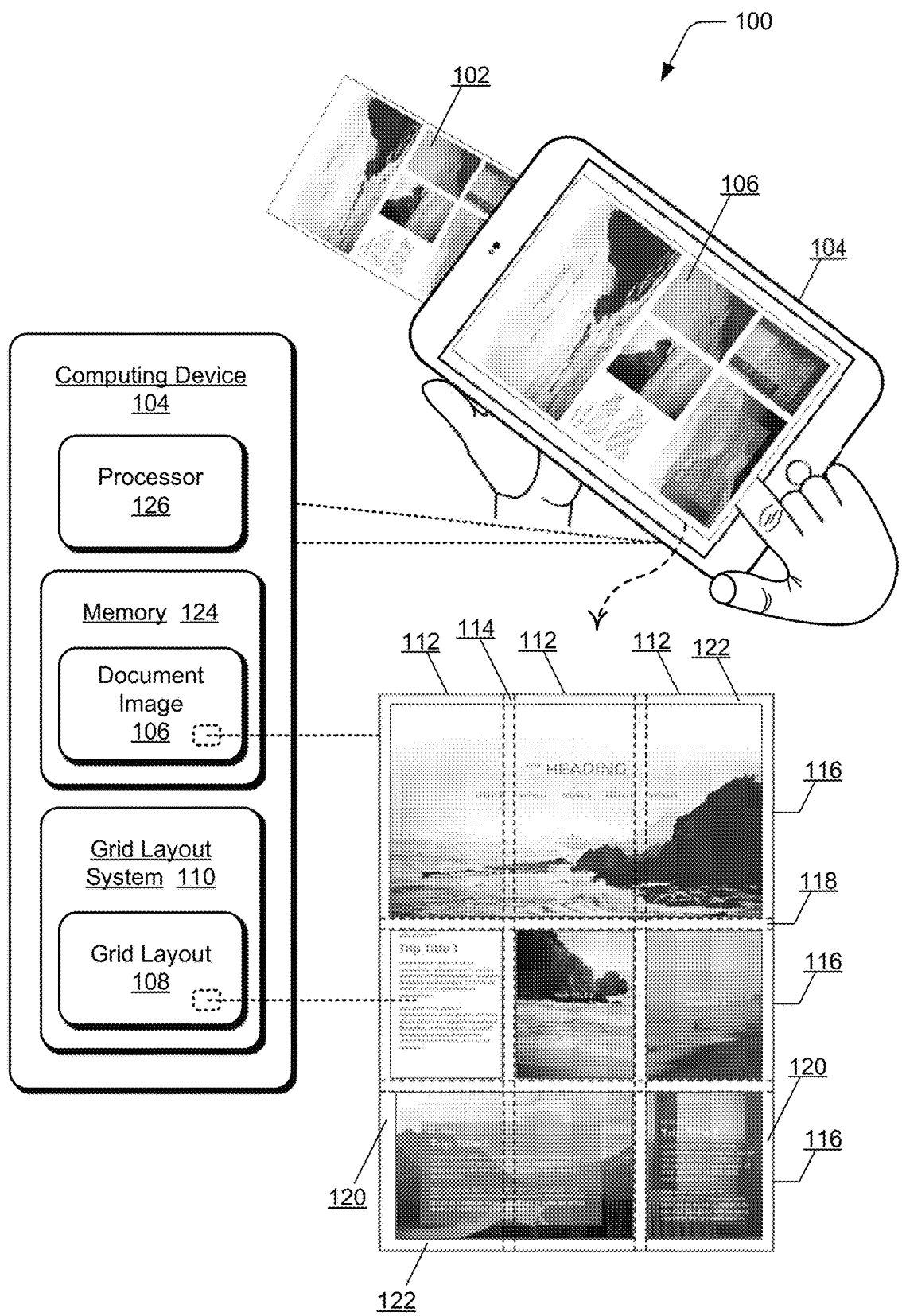
FIG. 1 illustrates an example environment in which aspects of grid layout determination from a document image can be implemented.

Implementations of grid layout determination from a document image are described, and provide that a user can determine the grid layout of any printed document by simply capturing an image of the printed document. A grid layout system can then determine the parameters of the grid layout used for the printed document right from the captured document image, such as the number of grid columns and spacing between the columns, the number of grid rows and spacing between the rows, and the document margins. Additionally, a graphic designer or other similar computer user can then use the determined grid layout in a digital media format with any other graphics application for document and page layout designs, incorporating the graphic designer's own content into the determined grid layout. The graphic designer can also then create a library of grid layout assets, which are reusable and always on-hand for subsequent projects.

In aspects of the described grid layout determination from a document image, a user can capture a document image of a printed or other physical document with a camera device, or with a computing device (e.g., mobile phone or tablet device) that has an integrated camera. A printed document may be any type of magazine page, flyer, book page, report, newspaper page, invitation, resume, and any other type of design document that has a layout generally in the form of a grid with rows and columns.

A computing device can be used to implement the grid layout system, which is designed to determine the grid layout of a printed document from the captured document image of the printed document. The grid layout system can determine the number of grid columns and the spacing between each of the columns in the grid layout. The grid layout system can also determine the number of grid rows and the spacing between each of the rows in the grid layout. The grid layout system can also determine the margins of the document from the document image, such as the left and right margins, as well as the top and bottom margins. The grid layout system can then determine the columns of the grid layout based on the width of the columns, the spacing between the columns, and based on the left and right margins of the document. The grid layout system can also determine the rows of the grid layout based on the height of the rows, the spacing between the rows, and based on the top and bottom margins of the document.

In aspects of the described grid layout determination from a document image, the grid layout system implements various modules to determine the grid layout of a printed document from the captured document image. For example, an elements module of the grid layout system receives the document image as an input and can determine feature elements of the document content. Any of the various types of printed or other physical documents can include feature elements as text, graphics, and/or a combination of text and graphics. The graphics in a document can include a photo, an illustration, or any other type of image as part of the document content. The elements module is also implemented to determine and remove artifacts of the document, such as page numbers, header content, footer content, etc. that will not be used in determining the overall grid layout of the document.

The elements module of the grid layout system can then generate a node tree of bounded elements that represent relationships of the feature elements in the document, where each of the bounded elements is considered in the determination of the grid layout of the rows and columns in the document. A bounded element may be any text block or a graphic in the document image that has a side along a column or a row in the grid layout. A bounded element may also represent a feature element of the document encompassed by another of the feature elements, in which case the encompassed feature element is disregarded. For example, a graphic (e.g., a photo image) in the document may have text printed over the graphic, but since the boundaries of the graphic encompass the overlaid text, only the bounded element for the graphic is considered when determining the grid layout of the document.

The elements module can then generate a containment model that includes the node tree of the bounded elements, and includes size and position data for each of the bounded elements in the document. Each feature element of the document is defined by a bounded element, such as to represent a text bounding box, an image bounding box for a graphic, etc. As noted above, if a bounded element of one feature element falls within another bounded element of another feature element, then the encompassed feature element is disregarded in the determination of the grid layout of the document. The containment model represents an organization of the bounded elements in the node tree from which a column layout of the columns in the document is determined, and from which a row layout of the rows in the document is determined.

A column layout module of the grid layout system is implemented to determine the column layout of the columns in the document based on the containment model, which includes calculating a quantity of the columns in the document. The column layout module can calculate the horizontal space width between the columns, as well as calculate the column width of each of the columns in the document. The column layout module can also calculate the left and right margins of the document, as well as the top and bottom margins of the document. Generally, the margins are a value of the number of pixels of the margin space after removing any artifacts from the document image. To calculate the margins, the column layout module calculates the distance between the edge of the document page to the first element encountered on all sides of the document. The column layout module can then calculate the quantity of the columns in the document based on the horizontal space width between the columns, the column width of each of the columns, and based on the left and right margins of the document.

Similarly, a row layout module of the grid layout system is implemented to determine the row layout of the rows in the document based on the containment model, which includes calculating a quantity of the rows in the document. The row layout module can calculate the vertical space height between the rows, as well as calculate the row height of each of the rows in the document. The row layout module can also calculate the top and bottom margins of the document as described above with reference to the column layout module. The row layout module can then calculate the quantity of the rows in the document based on the vertical space height between the rows, the row height of each of the rows, and based on the top and bottom margins of the document. The grid layout system determines the overall grid layout of the printed document from the captured document image based on the determined row and column layouts.

While features and concepts of grid layout determination from a document image can be implemented in any number of different devices, systems, networks, environments, and/or configurations, implementations of grid layout determination from a document image are described in the context of the following example devices, systems, and methods.

FIG. 1 illustrates an example environment 100 in which aspects of grid layout determination from a document image can be implemented. The example environment 100 includes a printed document 102, such as any type of magazine page, flyer, book page, report, newspaper page, invitation, resume, and any other type of design document that has a layout generally in the form of a grid with rows and columns. The example environment 100 also includes a computing device 104, such as any type of a mobile device, mobile phone, tablet device, camera device, and/or other type of device with an integrated camera. A camera device of the computing device 104 can be used to capture a document image 106 of the document 102, from which a grid layout 108 of the document can be determined.

As described in more detail below, the computing device 104 implements a grid layout system 110 that is designed to determine the grid layout 108 of the printed document 102 from the document image 106. For example, the grid layout system 110 can determine the number of grid columns 112 and the spacing 114 between each of the columns. The spacing 114 between each of the columns 112 is referred to herein as the horizontal space width between the columns, which is relative to the orientation of the document image 106 shown in the illustration. The grid layout system 110 can also determine the number of grid rows 116 and the spacing 118 between each of the rows. The spacing 118 between each of the rows 116 is referred to herein as the vertical space height between the rows, which is also relative to the orientation of the document image 106 shown in the illustration. The grid layout system 110 can also determine the margins of the printed document 102 from the document image 106, such as the left and right margins 120, as well as the top and bottom margins 122. The spacing 114 between the columns 112 and the spacing 118 between the rows 116 in the grid layout 108 is also be referred to as the "gutter spacing" in some implementations.

In this example environment 100, the computing device 104 includes a memory 124, which maintains the document image 106 of the printed document 102. The computing device 104 also includes a processor 126, and may include any number and combination of different components as further described with reference to the example device shown in FIG. 12. The computing device 104 implements the grid layout system 110, such as in software, in hardware, or as a combination of software and hardware components. In this example, the grid layout system 110 is implemented as a software application or modules, such as executable software instructions (e.g., computer-executable instructions) that are executable with a processing system (e.g., the processor 126) of the computing device 104 to implement the techniques of grid layout determination from a document image. The grid layout system 110 can be stored on computer-readable storage media, such as any suitable memory device (e.g., the device memory 124) or electronic data storage implemented in the computing device 104.

Figure 2:
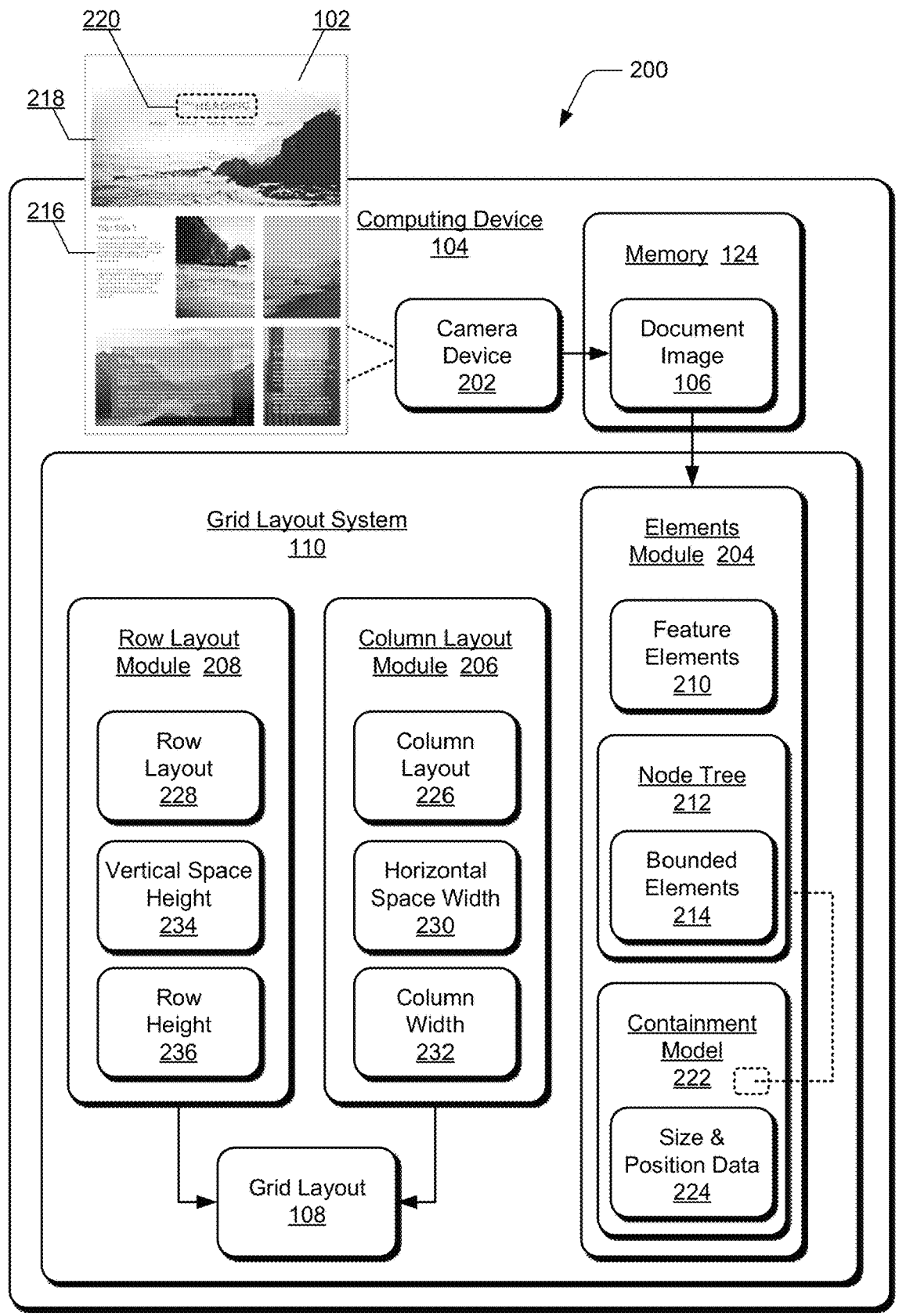
FIG. 2 illustrates an example implementation of a grid layout system in accordance with one or more aspects of grid layout determination from a document image.

FIG. 2 illustrates an example implementation 200 of the grid layout system 110 implemented with the computing device 104 in aspects of grid layout determination from a document image. Although shown and described as a component or system of the computing device 104, the grid layout system 110 may also be implemented as part of a cloud-based service system as shown and described with reference to FIG. 11. In this example implementation 200, the computing device 104 includes the memory 124, which maintains the document image 106 of the printed document 102, as well as the processor 126. The computing device 104 also includes a camera device 202, which can be utilized to capture the document image 106 of the printed document 102 as a digital image.

In this example implementation 200, the grid layout system 110 includes an elements module 204, a column layout module 206, and a row layout module 208. The various modules may be implemented as software applications or components of the grid layout system 110, and although the various modules are described and illustrated as separate modules, and combination of the elements module 204, the column layout module 206, and/or the row layout module 208 may be implemented together or as independent modules of the grid layout system.

The grid layout system 110 can receive the document image 106 of the printed document 102 as an input to the elements module 204, which is implemented to determine feature elements 210 of the document content in the document. Any of the various types of printed documents (also referred to herein as physical documents) can include feature elements 210 as text, graphics, and/or a combination of text and graphics. The graphics in a document can include a photo, an illustration, or any other type of image as part of the document content. The elements module 204 is also implemented to determine and remove artifacts of the document, such as page numbers, header content, footer content, and the like that will not be used in determining the overall grid layout 108 of the document.

The elements module 204 can then generate a node tree 212 of bounded elements 214 that represent relationships of the feature elements 210 in the document, where each of the bounded elements 214 is considered in the determination of the grid layout of the rows and columns in the document. The generation of the node tree 212 is further shown and described with reference to FIGS. 4-6. A bounded element 214 may be any text 216 or a graphic 218 (e.g., a photo image) in the document image 106 that has a side along a column or a row in the grid layout. A bounded element 214 may also represent a feature element of the document encompassed by another of the feature elements, in which case the encompassed feature element is disregarded. For example, the graphic 218 in the document has text 220 printed over the graphic, but since the boundaries of the graphic encompass the overlaid text, only the bounded element 214 for the graphic 218 is considered when determining the grid layout 108 of the document.

The elements module 204 can then generate a containment model 222 that includes the node tree 212 of the bounded elements 214, and includes size and position data 224 for each of the bounded elements 214 in the document. The size and position data 224 of each bounded element 214 of the document can be based on pixel locations in the document image 106 that correspond to a particular bounded element. Each feature element 210 of the document is defined by a bounded element 214, such as to represent a text bounding box, an image bounding box for a graphic, etc. Each bounded element 214 can be designated by the number of pixels from the top/sides, and the width/height of the element. The size and position data 224 that defines a bounded element 214 is based on the right, left, top, and bottom pixels for a particular bounded element. As noted above, if a bounded element of one feature element falls within another bounded element of another feature element, then the encompassed feature element is disregarded in the determination of the grid layout 108 of the document. The containment model 222 represents an organization of the bounded elements 214 in the node tree 212 from which a column layout 226 of the columns 112 in the document is determined, and from which a row layout 228 of the rows 116 in the document is determined.

The column layout module 206 of the grid layout system 110 is implemented to determine the column layout 226 of the columns 112 in the document based on the containment model 222, which includes calculating a quantity of the columns in the document. The column layout module 206 can calculate the horizontal space width 230 between the columns 112, as well as calculate the column width 232 of each of the columns 112 in the document. The horizontal space width 230 between the columns 112 (also referred to herein as the "horizontal gutter spacing" between columns), as calculated by the column layout module 206, is further shown and described with reference to FIGS. 7 and 8. Generally, the horizontal space width 230 between the columns 112 is a value of the number of pixels difference between the columns.

To calculate the horizontal space width 230, all of the nodes of the node tree 212 are sorted with respect to the x-value of each node, so that the nodes are arranged as they appear in the document from left to right. The nodes are then grouped along the y-axis using a clustering algorithm, such as K-means clustering into a vertical-set. The column layout module 206 can then find the difference between all of the nodes of the vertical-set, c and the vertical-set, and c+1. The result can be stored in an array, identified as horizontal-gutter-array in this example. The column layout module 206 can group the differences in the horizontal-gutter-array and find the most frequent set in the array. The horizontal space width 230 is then an average of all values in the most frequent set of the horizontal-gutter-array.

The column width 232 of each of the columns 112 in the document, as calculated by the column layout module 206, is further shown and described with reference to FIG. 9, which encompasses FIGS. 9A-9C. Generally, the column width 232 of each of the columns 112 is a value of the number of pixels of the width. To calculate the column width 232, the nodes of the node tree 212 with similar widths are grouped using a clustering algorithm, such as K-means clustering into width-sets. The column layout module 206 can then sort width-set of the width-sets based on the number of elements to generate a set containing the most number of elements to the least number of elements. For every node in width-set, if the element type is an image, then the weight, $W_e$ of the node is increased. In implementations, a graphic is weighted more than the text for determining the column layout 226 and calculating the quantity of the columns 112 in the document. The column layout module 206 can then calculate the average width of all nodes in the width-set for i=0 to width-set.length, where an avg+=$W_i$× $W_{ei}$ ($W_i$=the width of element i, $W_{ei}$=the weight of element i) and allWeights+=$W_{ei}$ average-width=avg/allWeights. The column layout module 206 can then determine if the average-width of width-sets are in proportion, and if they are, then takes the average-width of width-set with the least width as the column-width, otherwise, the average-width of the width-set with the maximum number of nodes.

The column layout module 206 can also calculate the left and right margins 120 of the document, as well as the top and bottom margins 122 of the document. Generally, the margins 120 and 122 are a value of the number of pixels of the margin space after removing any artifacts from the document image 106. To calculate the margins 120 and 122, the column layout module 206 calculates the distance between the edge of the document page to the first element encountered on all sides of the document.

The column layout module 206 can then calculate the quantity of the columns 112 in the document based on the horizontal space width 230 between the columns, the column width 232 of each of the columns, and based on the left and right margins 120 of the document. To calculate the number of columns 112, the column layout module 206 uses the values determined from the above operations in the following formula: number-of-columns=(page.width+horizontal-gutter-size−margins.left, margins.right)/(column.width+horizontal-gutter-size).

Similarly, the row layout module 208 of the grid layout system 110 is implemented to determine the row layout 228 of the rows 116 in the document based on the containment model 222, which includes calculating a quantity of the rows in the document. The row layout module 208 can calculate the vertical space height 234 between the rows 116, as well as calculate the row height 236 of each of the rows 116 in the document. The vertical space height 234 between the rows 116 (also referred to herein as the "vertical gutter spacing" between rows), as calculated by the row layout module 208, is further shown and described with reference to FIG. 10, which encompasses FIGS. 10A-10D. Generally, the vertical space height 234 between the rows 116 is a value of the number of pixels difference between the rows.

The row layout module 208 can also calculate the top and bottom margins 122 of the document as described above with reference to the column layout module 206 calculating the distance between the edge of the document page to the first element encountered on all sides of the document. The row layout module 208 can then calculate the quantity of the rows 116 in the document based on the vertical space height 234 between the rows, the row height 236 of each of the rows, and based on the top and bottom margins 122 of the document. The row layout module 208 can calculate the quantity of the rows 116 in the document similarly to the column layout module 206 calculating the quantity of the columns 112 in the document. The row layout module 208 can calculate the vertical space height 234, which is a value of vertical difference between two bounded elements obtained in pixels. The row layout module 208 can also calculate the row height 236 of each of the rows, which is a value of height of one bounded element as obtained in pixels. The row layout module 208 can then calculate the quantity of the rows 116 in the document using the following formula: number-of-rows=(page.height+vertical-gutter-size−margins.top, margins.bottom)/(column.height+vertical-gutter-size).

Example methods 300, 600, 800, 900, and 1000 are described with reference to respective FIGS. 3, 6, 8, 9A-9C, and 10A-10D in accordance with one or more aspects of grid layout determination from a document image. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
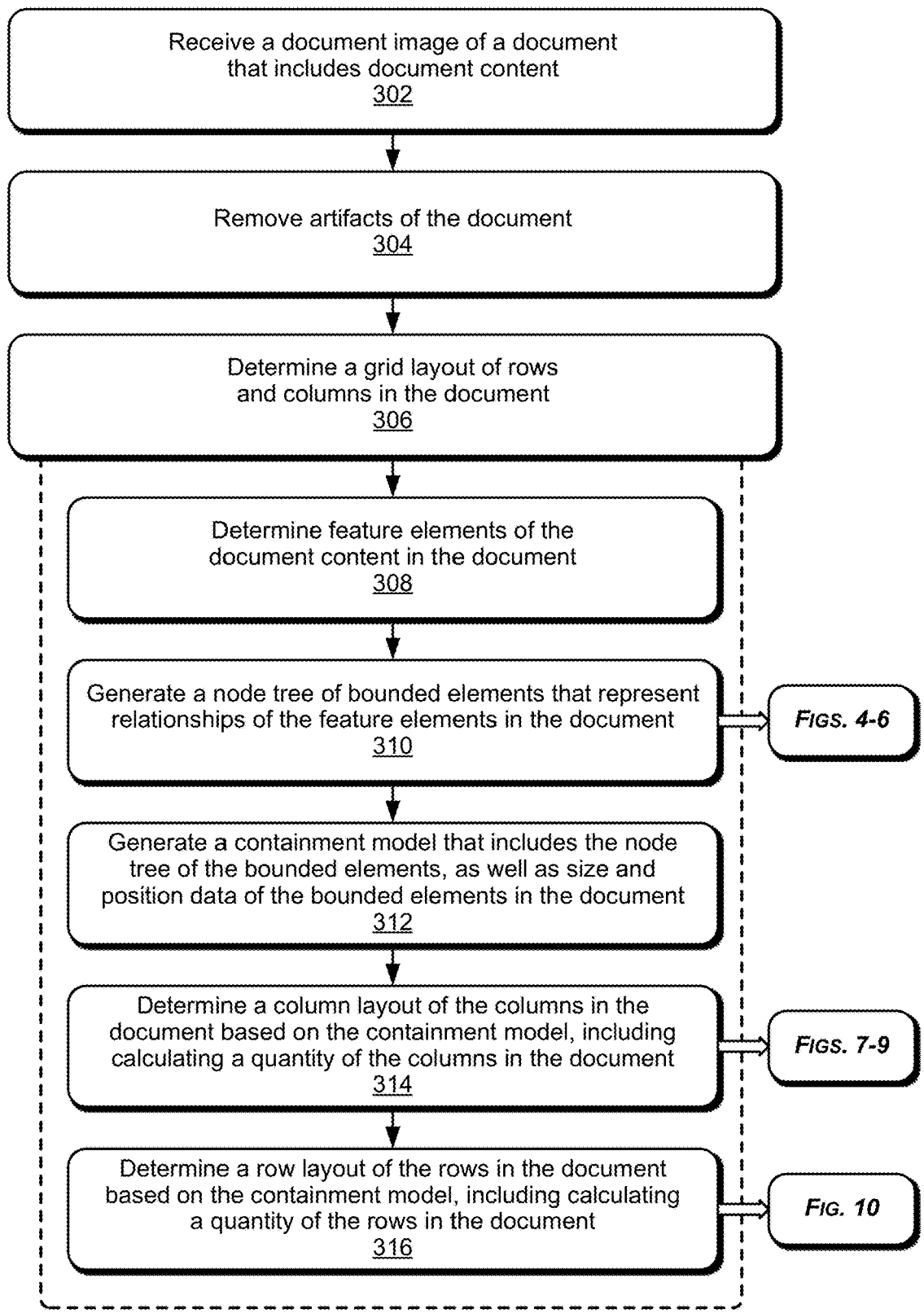
FIG. 3 illustrates an overall example method of grid layout determination from a document image in accordance with one or more implementations.

FIG. 3 illustrates an overall example method 300 for grid layout determination from a document image, and is generally described with reference to the grid layout system that is shown and described with reference to FIGS. 1 and 2. The order in which the method is described is not intended to be construed as a limitation, and any number or combination of the method operations can be combined in any order to implement a method, or an alternate method.

At 302, a document image of a document that includes document content is received. For example, the grid layout system 110 receives the document image 106 of the printed document 102 as an input to the elements module 204. At 304, artifacts of the document are removed. For example, the elements module 204 determines and removes the artifacts of the document from the document image 106, such as page numbers, header content, footer content, and the like that will not be used in determining the overall grid layout 108 of the document. At 306, a grid layout of rows and columns in the document is determined. For example, the grid layout system 110 determines the grid layout 108 of the printed document 102 from the document image 106, as described with reference to operations 308-314 of the described method.

At 308, feature elements of the document content in the document are determined. For example, the elements module 204 of the grid layout system 110 determines the feature elements 210 of the document content in the document. Any of the various types of printed documents (also referred to herein as physical documents) can include feature elements 210 as text, graphics, and/or a combination of text and graphics, where the graphics in a document can include a photo, an illustration, or any other type of image as part of the document content.

At 310, a node tree is generated of bounded elements that represent relationships of the feature elements in the document. For example, the elements module 204 of the grid layout system 110 generates the node tree 212 of the bounded elements 214 that represent relationships of the feature elements 210 in the document, where each of the bounded elements 214 is considered in the determination of the grid layout of the rows and columns in the document. The generation of the node tree 212 is further shown and described with reference to FIGS. 4-6.

At 312, a containment model is generated that includes the node tree of the bounded elements, and includes size and position data for each of the bounded elements in the document. For example, the elements module 204 of the grid layout system 110 generates the containment model 222 that includes the node tree 212 of the bounded elements 214, and includes the size and position data 224 for each of the bounded elements 214 in the document. The size and position data 224 of each bounded element 214 of the document is based on pixel locations in the document image 106 that correspond to a particular bounded element. The containment model 222 represents an organization of the bounded elements 214 in the node tree 212 from which the column layout 226 of the columns 112 in the document is determined, and from which the row layout 228 of the rows 116 in the document is determined.

At 314, a column layout of the columns in the document is determined based on the containment model, which includes calculating a quantity of the columns in the document. For example, the column layout module 206 of the grid layout system 110 determines the column layout 226 of the columns 112 in the document based on the containment model 222, which includes calculating a quantity of the columns in the document. The column layout module 206 calculates the horizontal space width 230 between the columns 112, as well as calculates the column width 232 of each of the columns 112 in the document. The horizontal space width 230 between the columns 112 (also referred to herein as the "horizontal gutter spacing" between columns), as calculated by the column layout module 206, is further shown and described with reference to FIGS. 7 and 8. The column width 232 of each of the columns 112 in the document, as calculated by the column layout module 206, is further shown and described with reference to FIG. 9. The column layout module 206 also calculates the left and right margins 120 of the document. The column layout module 206 then calculates the quantity of the columns 112 in the document based on the horizontal space width 230 between the columns, the column width 232 of each of the columns, and based on the left and right margins 120 of the document.

At 316, a row layout of the rows in the document is determined based on the containment model, which includes calculating a quantity of the rows in the document. For example, the row layout module 208 of the grid layout system 110 determines the row layout 228 of the rows 116 in the document based on the containment model 222, which includes calculating a quantity of the rows in the document. Calculating the row layout of the rows in the document by the row layout module 208 is further shown and described with reference to FIG. 10. The row layout module 208 calculates the vertical space height 234 between the rows 116 (also referred to herein as the "vertical gutter spacing" between rows), as well as calculates the row height 236 of each of the rows 116 in the document. The row layout module 208 also calculates the top and bottom margins 122 of the document. The row layout module 208 then calculates the quantity of the rows 116 in the document based on the vertical space height 234 between the rows, the row height 236 of each of the rows, and based on the top and bottom margins 122 of the document.

Figure 4:
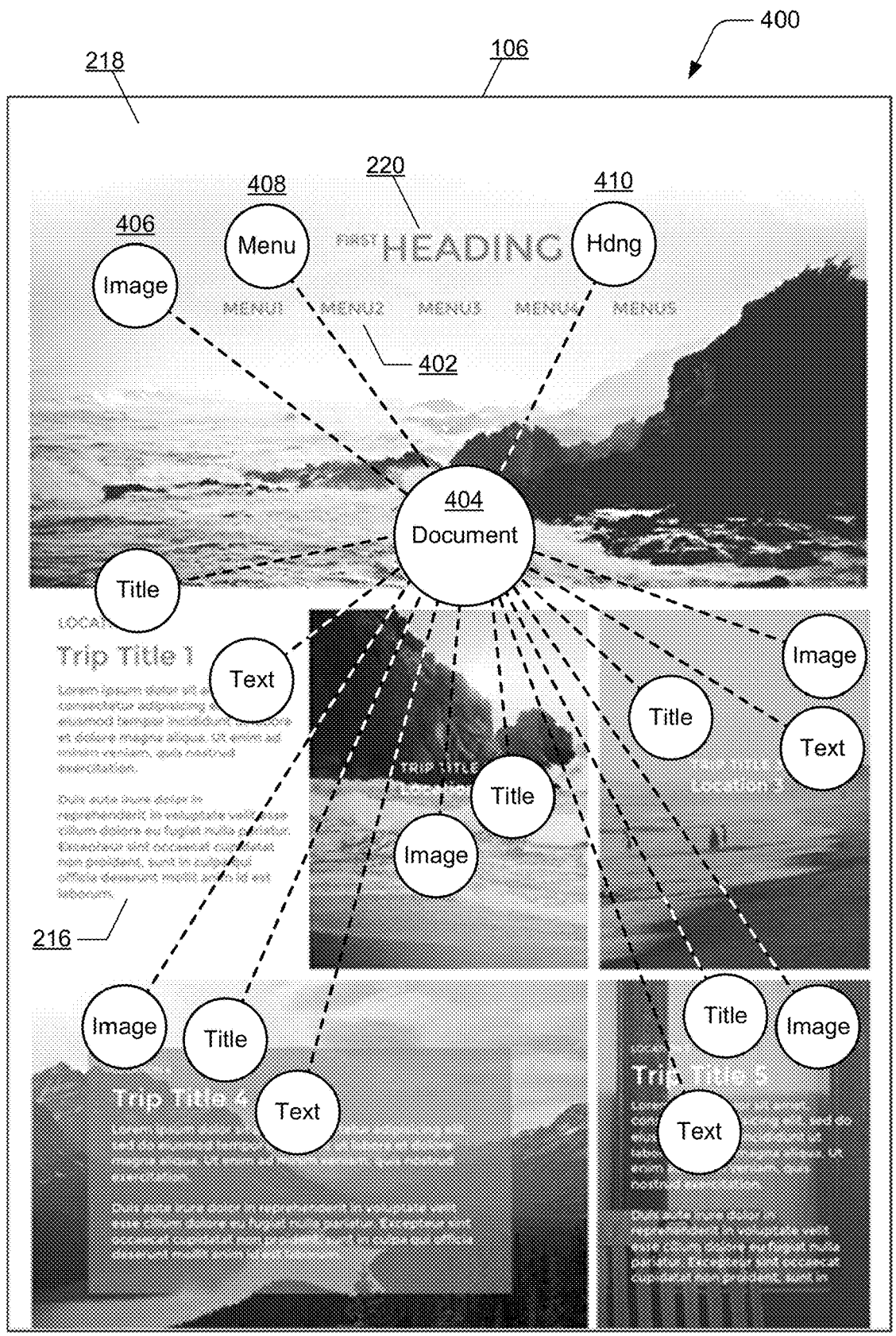
FIG. 4 illustrates an example of a printed document and determination of feature elements from a document image of the printed document in aspects of grid layout determination from a document image.

FIG. 4 illustrates an example depiction 400 of the printed document 102, and a determination of the feature elements 210 from the document image 106 in aspects of the described grid layout determination from a document image. In this example, the overall document canvas includes the text and graphics as the document feature elements 210. Any of the various types of printed documents (also referred to herein as physical documents) can the include feature elements 210 as text, graphics, and/or a combination of text and graphics. The graphics in a document can include a photo, an illustration, or any other type of image as part of the document content. As described above, the grid layout system 110 can receive the document image 106 of the printed document 102 as an input to the elements module 204, which is implemented to determine the feature elements 210 of the document content in the document. For example, the graphic 218 (e.g., a photo image), the block of text 216, as well as the "heading" text 220 and the "menu" text 402 over the graphic 218 are all examples of feature elements 210 of the document.

The feature elements 210 of the document image 106 are determined by the elements module 204 as the nodes of the node tree 212. For example, the node tree 212 is generated with a root node 404 (no text or graphics) that corresponds to the overall document image 106 of the document 102. Each of the other nodes (e.g., the feature elements 210) are also determined as nodes of the node tree 212, such as an image node 406 that corresponds to the graphic 218, a menu node 408 that corresponds to the text 402 over the graphic 218, and a heading node 410 that corresponds to the heading text 220 over the graphic 218.

Figure 5:
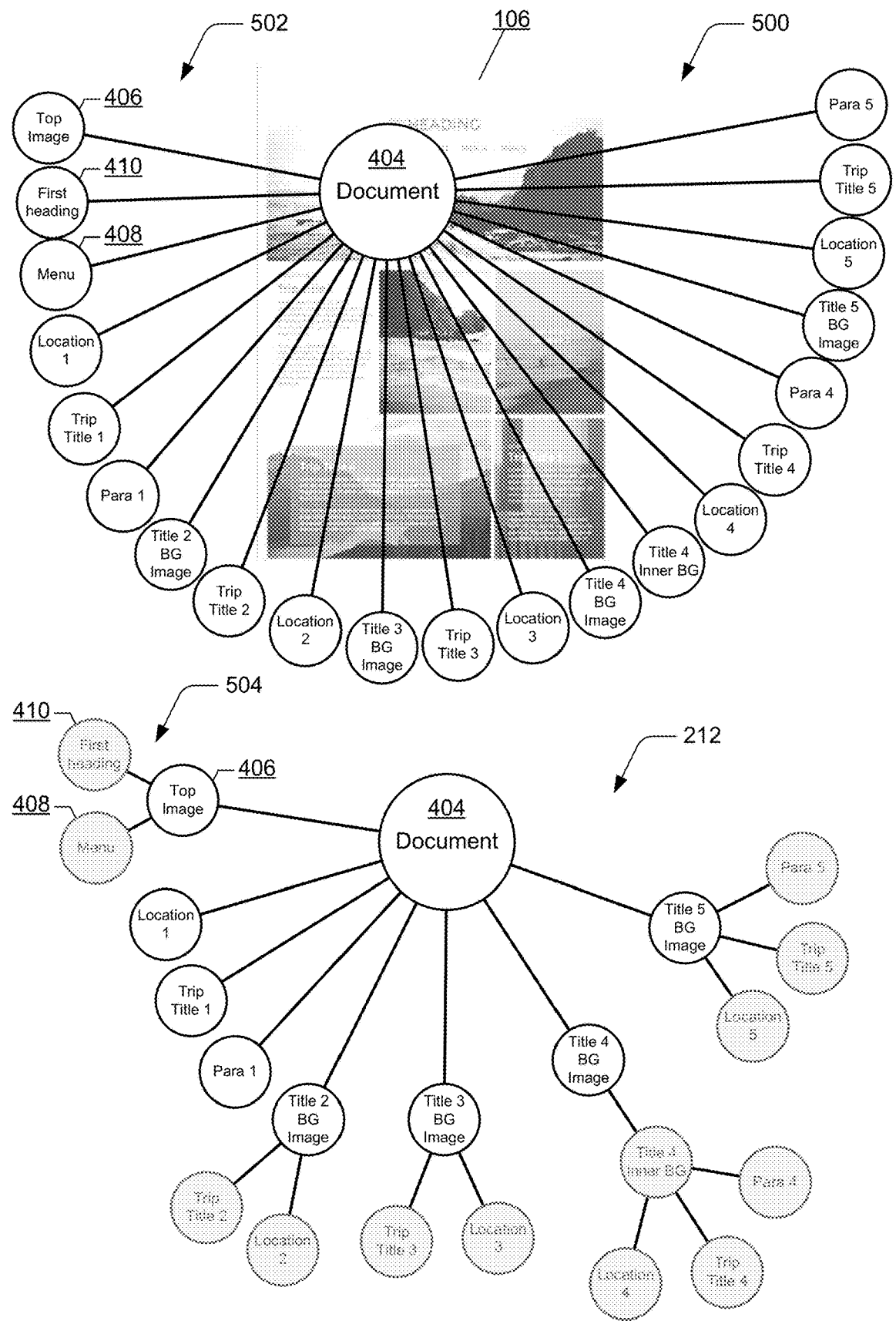
FIG. 5 illustrates an example of a node tree as generated in aspects of grid layout determination from a document image.

FIG. 5 further illustrates an example 500 of the node tree 212 as generated by the elements module 204 in aspects of the described grid layout determination from a document image. In this example 500, the node tree 212 is constructed based on the order in which each of the feature elements are encountered in the document image 106. The root node 404 that corresponds to the document image 106 stores the size and position of the overall document canvas element, and each node of the respective feature elements is added with the size and position data that describes each feature element. The elements module 204 can then restructure through the node tree 212 to add every bounded element 214 as a first-level node of the node tree, with encompassed feature elements added to the node tree 212 as second-level nodes to the respective bounded element that encompasses a feature element. This is further shown and described below with reference to FIG. 6.

For example, as shown at 502, the elements module 204 initially constructs the node tree 212 with the image node 406, the menu node 408, and the heading node 410 as nodes of the root node 404 that corresponds to the overall document image 106. Then as shown at 504, the elements module 204 restructures through the node tree 212 to add the image node 406, which is a bounded element, as a first-level node from the root node 404. The bounded element that represents the graphic 218 (e.g., a photo image) in the document image 106 encompasses the feature elements of the heading text 220 and the menu text 402. Accordingly, the elements module 204 adds the menu node 408 and the heading node 410 as second-level nodes to the bounded element that represents the graphic 218, which encompasses the heading text 220 and the menu text 402. As noted above, the second-level nodes of the node tree 212 correspond to feature elements 210 that are encompassed by a bounded element, and are not considered in determining the grid layout 108 of the document.

Figure 6:
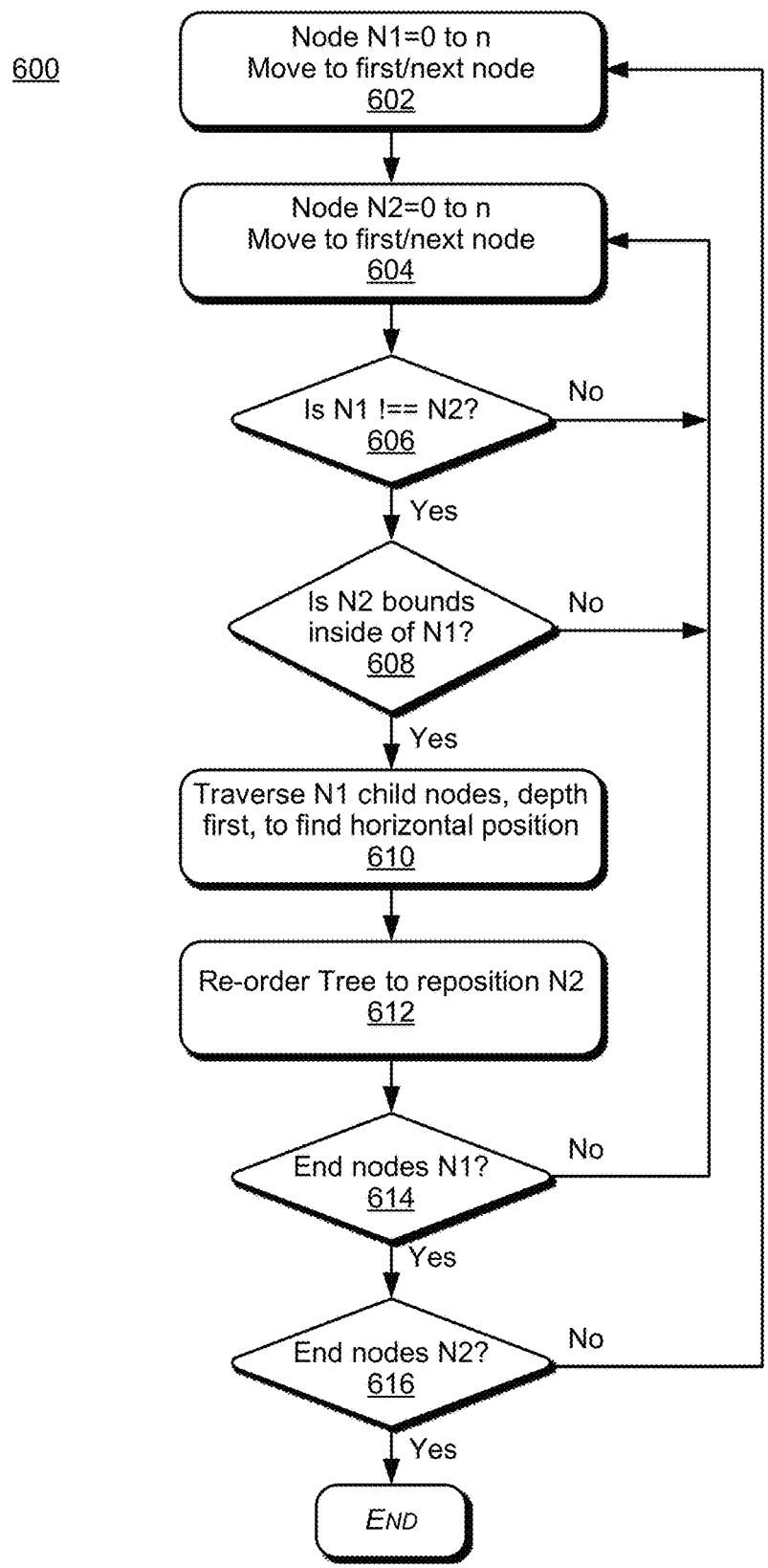
FIG. 6 illustrates an example method of grid layout determination from a document image in accordance with one or more implementations.

FIG. 6 illustrates an example method 600 for grid layout determination from a document image, and is generally described with reference to generation of the node tree by the grid layout system as described with reference to FIGS. 4 and 5. The order in which the method is described is not intended to be construed as a limitation, and any number or combination of the method operations can be combined in any order to implement a method, or an alternate method.

At 602, a node N1 of the node tree equals zero to n, and iterates from the first node of the node tree through all of the next nodes in the node tree. At 604, a node N2 of the node tree equals zero to n, and iterates from the first node of the node tree through all of the next nodes in the node tree. For example, the elements module 204 of the grid layout system 110 iterates through the nodes of the node tree 212 in a nested loop to determine the feature elements 210 that are encompassed by a respective bounded element 214.

At 606, a determination is made as to whether the node N1 is not node N2. If node N1 is equal to itself (i.e., "No" from 606), then the method continues at 604. Alternatively, if node N1 is not node N2 (i.e., "Yes" from 606), then at 608, a determination is made as to whether the bounds of node N2 is inside of (e.g., encompassed) by node N1. If the bounds of node N2 are not encompassed by node N1 (i.e., "No" from 608), then the method continues at 604. Alternatively, if the bounds of node N2 are encompassed by node N1 (i.e., "Yes" from 608), then at 610, the child nodes (e.g., the second-level feature elements) of the node N1 are traversed, depth first, to determine a horizontal position of each node. At 612, the node tree is re-ordered to reposition the current node N2 in the iteration process. For example, the elements module 204 of the grid layout system 110 adds encompassed feature elements to the node tree 212 as second-level nodes to the respective bounded element that encompasses a feature element.

At 614, a determination is made as to whether the iterative process has reached the end of nodes N1. If the iterative process has not reached the end of nodes N1 (i.e., "No" from 614), then the method continues at 604. Alternatively, if the iterative process has reached the end of nodes N1 (i.e., "Yes" from 614), then at 616, a determination is made as to whether the iterative process has reached the end of nodes N2. If the iterative process has not reached the end of nodes N2 (i.e., "No" from 616), then the method continues at 602. Alternatively, if the iterative process has reached the end of nodes N2 (i.e., "Yes" from 616), then the process is ended.

Figure 7:
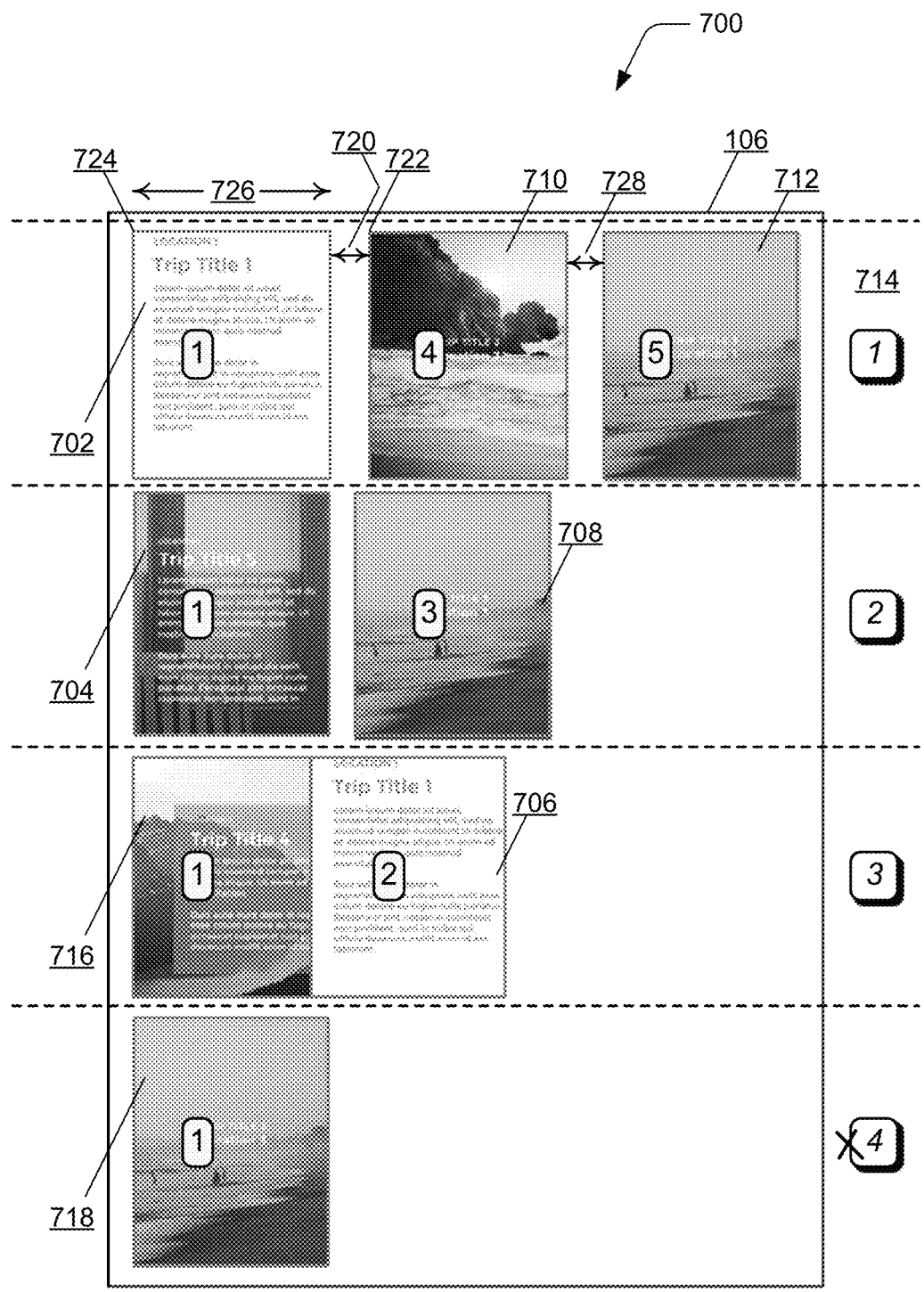
FIG. 7 illustrates an example of a document image and determination of column spacing between columns of a grid layout in aspects of grid layout determination from a document image.

FIG. 7 illustrates an example depiction 700 of a document image 106, and a determination of the horizontal space width 230 between the columns 112 (also referred to herein as the "horizontal gutter spacing" between columns), as calculated by the column layout module 206 of the grid layout system 110 in aspects of the described grid layout determination from a document image. In this example, the document image 106 has several feature elements of the printed document from which the document image is captured. The column layout module 206 is implemented to order the feature elements by their respective x-position along an x-axis starting at the left of the document image. The feature elements in the document image are shown ordered in levels one through five (1-5) according to the x-axis position of a respective feature element. For example, feature elements 702 and 704 are ordered in level one, while feature element 706 is ordered in level two, feature element 708 is ordered in level three, feature element 710 is ordered in level four, and feature element 712 is ordered in level five.

The column layout module 206 can then group the feature elements in groups 714 with respect to the y-axis starting at the top of the document image 106 so that all of the feature elements at a particular y-axis are grouped together. For example, the feature elements 702, 710, and 712 are sorted into group one, the feature elements 704 and 708 are sorted into group two, the feature elements 706 and 716 are sorted into group three, and a feature element 718 is sorted into group four. The column layout module 206 is implemented to then determine the spacing difference between each of the feature elements in the respective groups based on the following formula: difference=$X_{next}-(X_{current}+W_{current})$ where the difference 720 is the horizontal space width 230 (e.g., the "horizontal gutter spacing") between the feature elements 702 and 710 based on the x-axis position 722 of the feature element 710 ($X_{next}$) minus the x-axis position 724 of the feature element 702 ($X_{current}$) plus the width 726 of the feature element 702 ($W_{current}$).

The column layout module 206 can determine the spacing difference 720 between the feature elements 702 and 710; the spacing difference 728 between the feature elements 710 and 712; and the spacing difference between the feature elements 716 and 706 (e.g., which is zero in this example because feature element 706 overlaps feature element 716). The single element group four that has just the one feature element 718 is not considered in the determination of the horizontal space width 230. The spacing differences are values based on the number of pixels between the various feature elements, and the column layout module 206 is implemented to identify the value of the spacing difference that occurs most often. For example, the spacing differences between the feature elements in a document image may be determined as values of 20, 30, 10, 10, 10, and 20 as the number of pixels for each of the respective spacing widths. Accordingly, the column layout module 206 determines the overall horizontal space width 230 for the grid layout 108 as the ten (10) pixel value.

Figure 8:
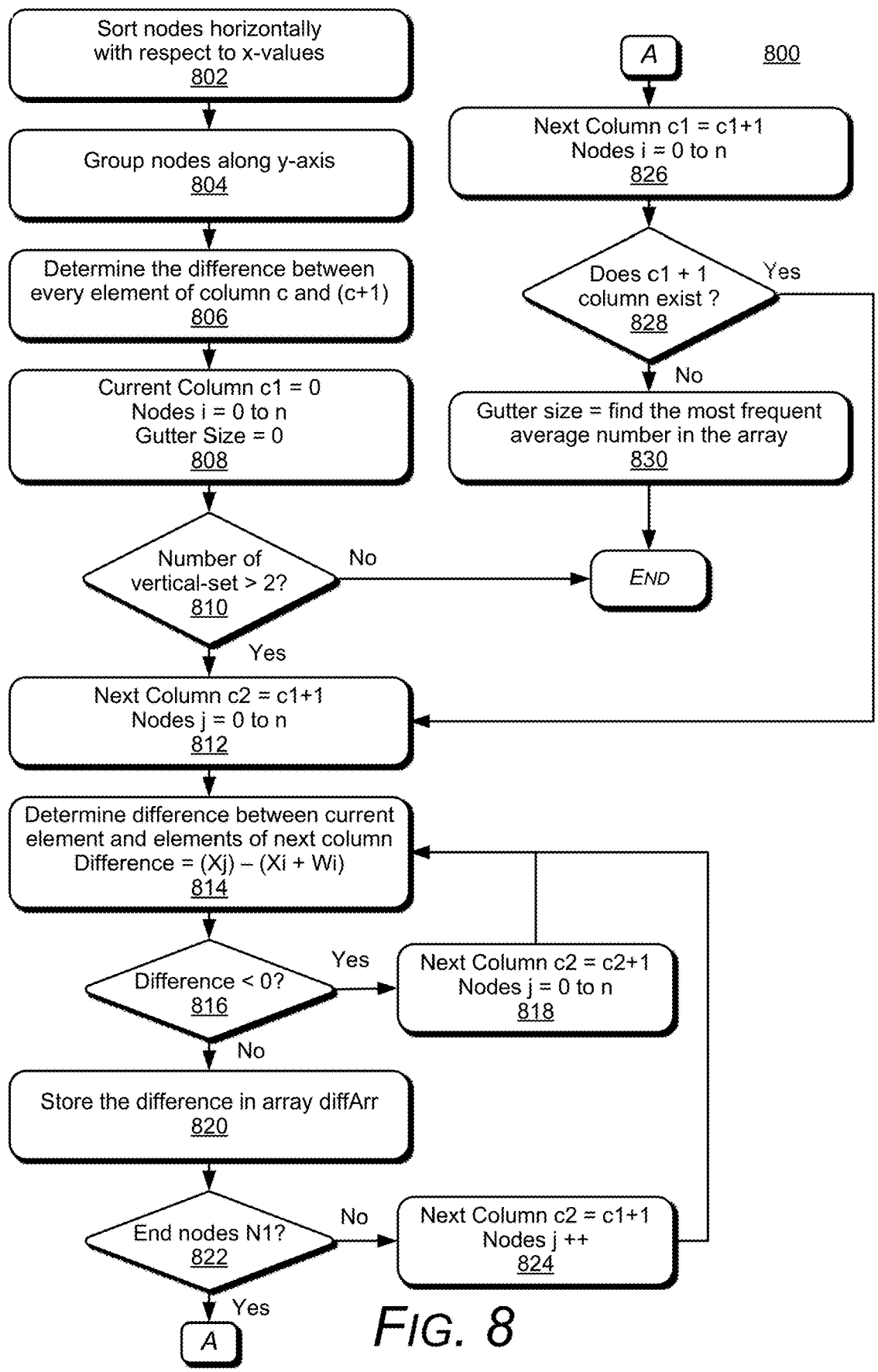
FIG. 8 illustrates an example method of grid layout determination from a document image in accordance with one or more implementations.

FIG. 8 illustrates an example method 800 for grid layout determination from a document image, and is generally described with reference to determining the overall horizontal space width (the "horizontal gutter spacing" between columns) for a grid layout as described with reference to FIGS. 1-3 and 7. The order in which the method is described is not intended to be construed as a limitation, and any number or combination of the method operations can be combined in any order to implement a method, or an alternate method.

At 802, the nodes are sorted horizontally with respect to x-values, and at 804, the nodes are grouped along the y-axis. For example, the column layout module 206 of the grid layout system 110 sorts the nodes (e.g., the feature elements of a document image 106) horizontally by their respective x-position along an x-axis starting at the left of the document image. The column layout module 206 also groups the nodes with respect to the y-axis starting at the top of the document image 106 so that all of the feature elements at a particular y-axis are grouped together. At 806, the difference between every element of column c and (c+1) is determined, where at 808, the current column c1=0; the nodes i=0 to n; and the gutter size=0. For example, the column layout module 206 determines the spacing differences between each of the feature elements in the document image.

At 810, a determination is made as to whether the number of the vertical-set is greater than two, and if not the process ends. As noted above, the single element group four that has just the one feature element 718 is not considered in the determination of the horizontal space width 230 by the column layout module 206. If a group of the feature elements is greater than two (i.e., "Yes" from 810), then at 812, the next column c2=c1+1 and the nodes j=0 to n. Additionally, at 814, a spacing difference between the current element and the elements of a next column are determined, where the difference=(Xj)−(Xi+Wi).

At 816, a determination is made as to whether the difference is <0, in which case if it is (i.e., "Yes" from 816), then at 818, the next column c2=c2+1, the nodes j=0 to n, and the method continues at 814. Alternatively, if the difference is not <0 (i.e., "No" from 816), then at 820, the determined difference is stored in an array, identified as the "diffArr" in this example. At 822, a determination is made as to whether the iterative process has reached the end of nodes N1. If the iterative process has not reached the end of nodes N1 (i.e., "No" from 822), then at 824, the next column c2=c1+1, the nodes j++, and the method continues at 814. Alternatively, if the iterative process has reached the end of nodes N1 (i.e., "Yes" from 822), then at 826, the next column c1=c1+1 and the nodes i=0 to n. At 828, a determination is made as to whether the c1+1 column exists, in which case if it does, the method continues at 812. Alternatively, if the next column does not exist, then at 830, the column layout module 206 determines the horizontal space width (the "horizontal gutter spacing" between columns) as the most frequent average number in the array, "diffArr".

Figure 9A:
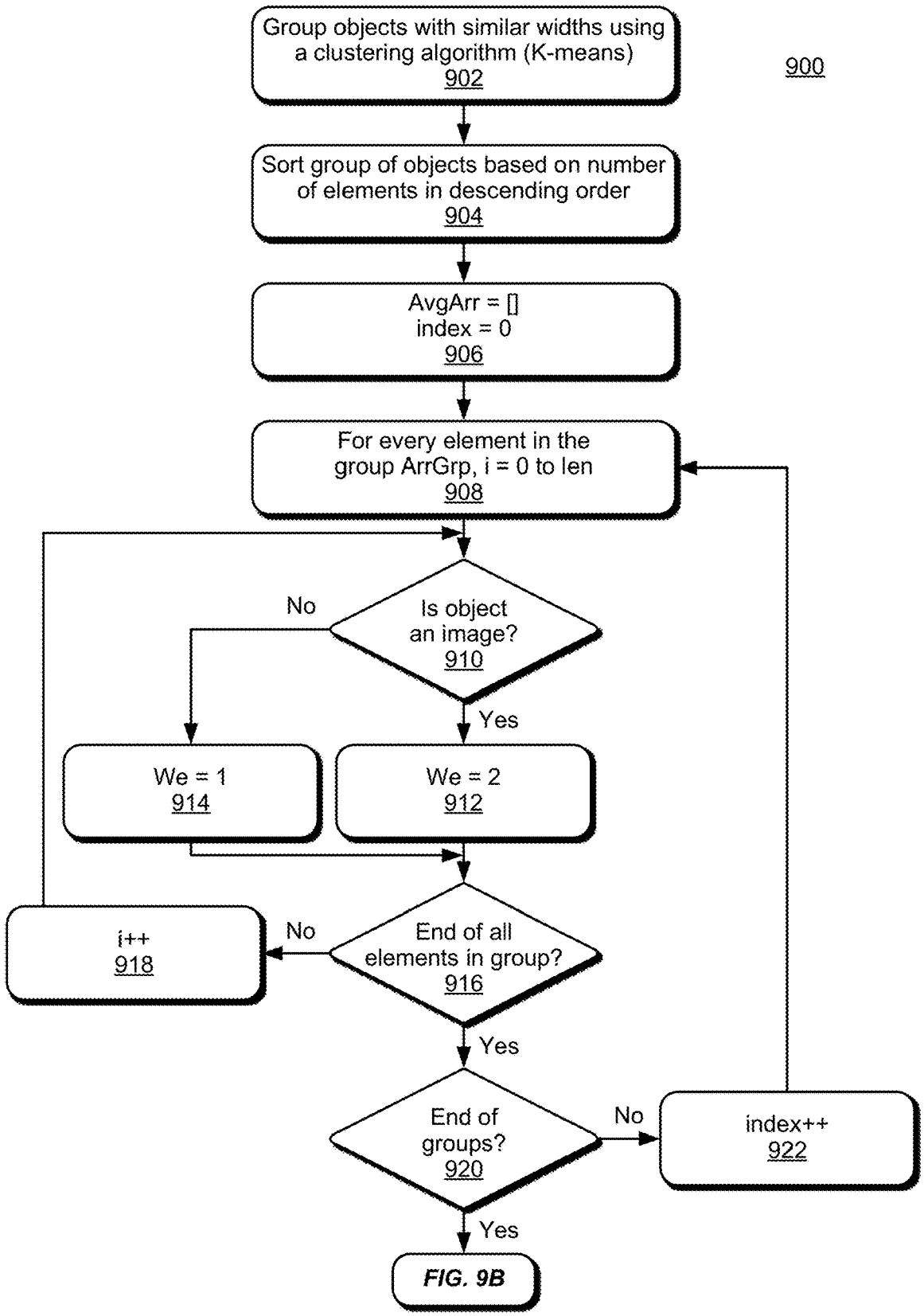
FIG. 9 encompasses FIGS. 9A-9C, and illustrates an example method of grid layout determination from a document image in accordance with one or more implementations.
Figure 9B:
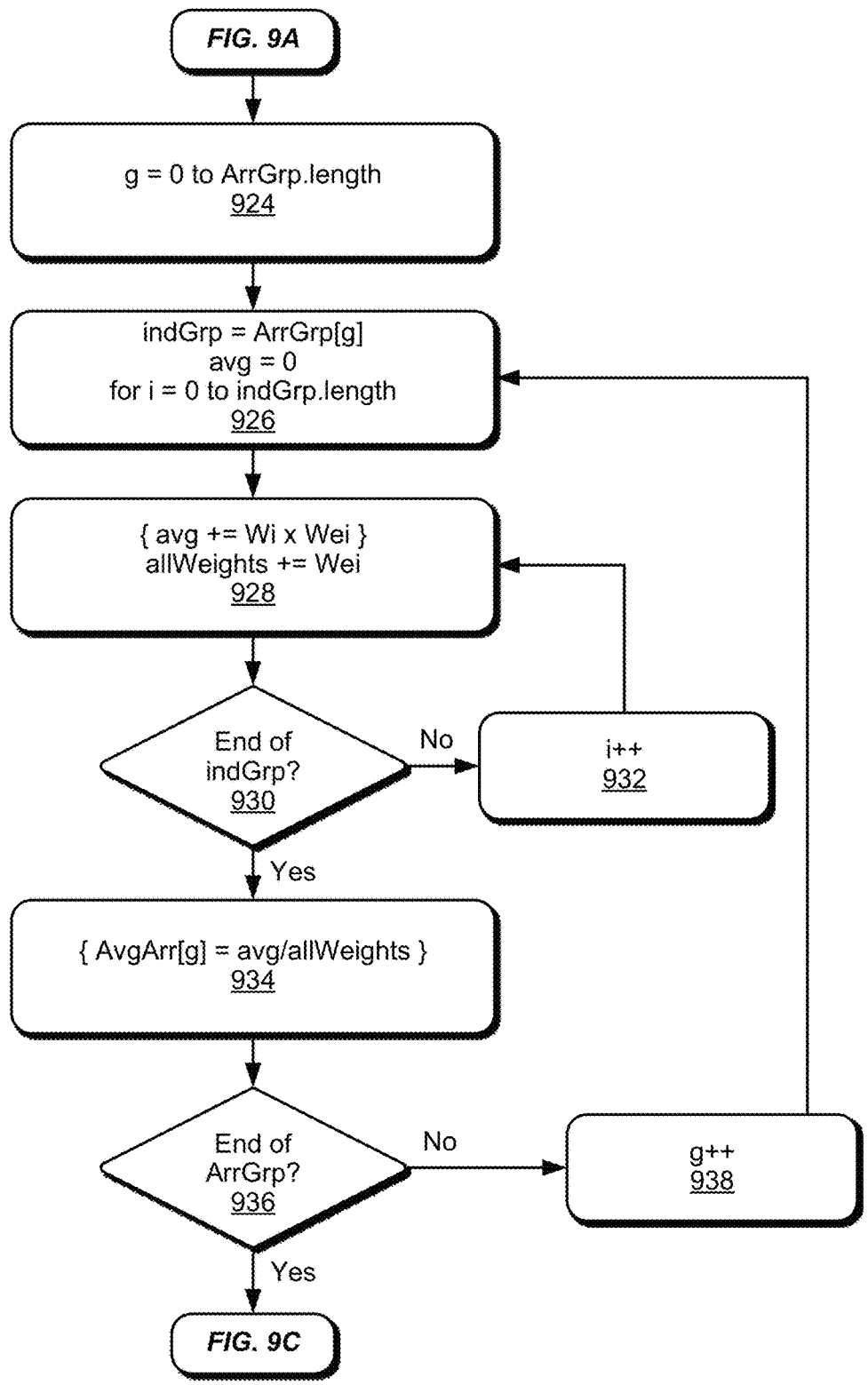
Figure 9C:
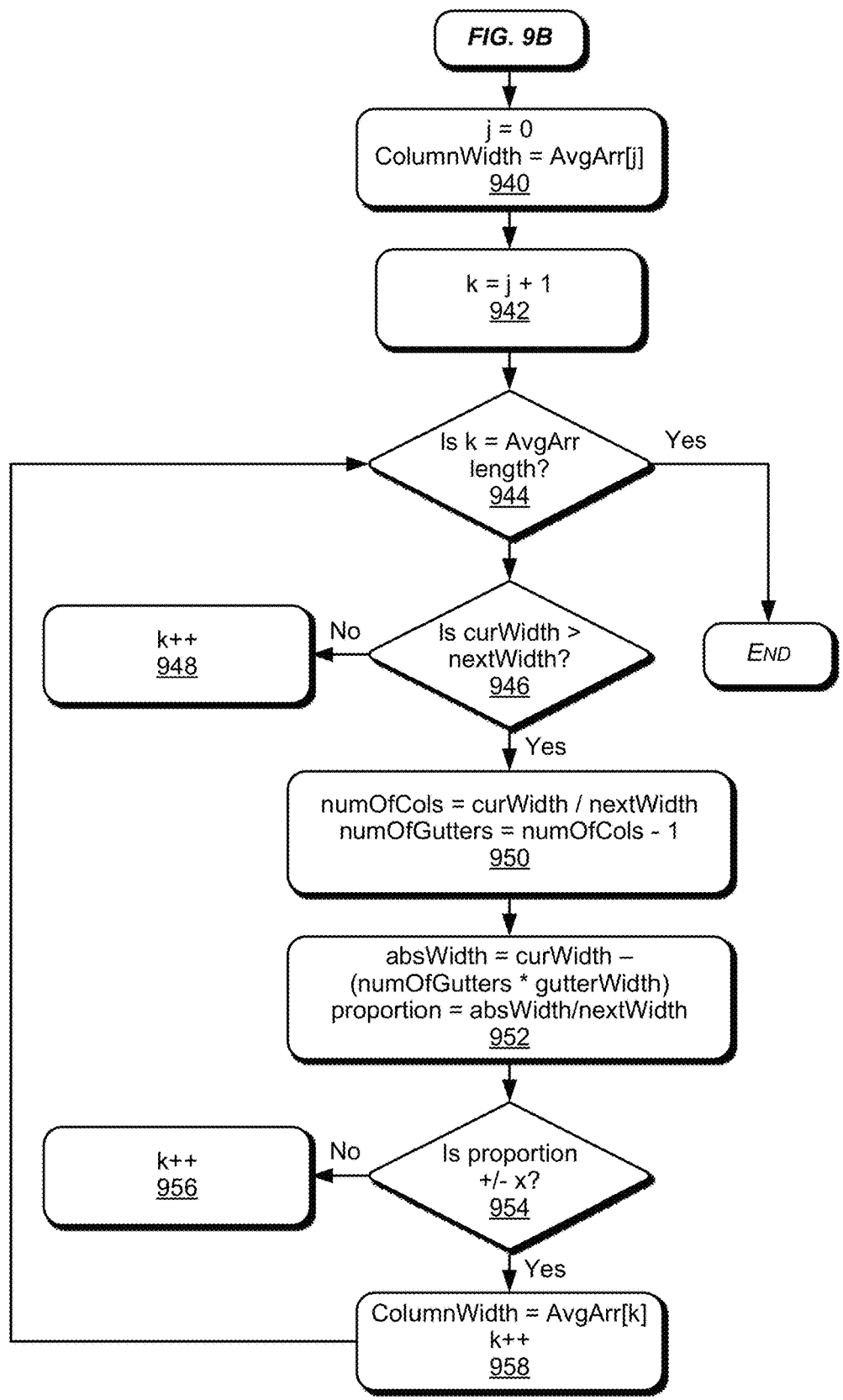
Figure 10A:
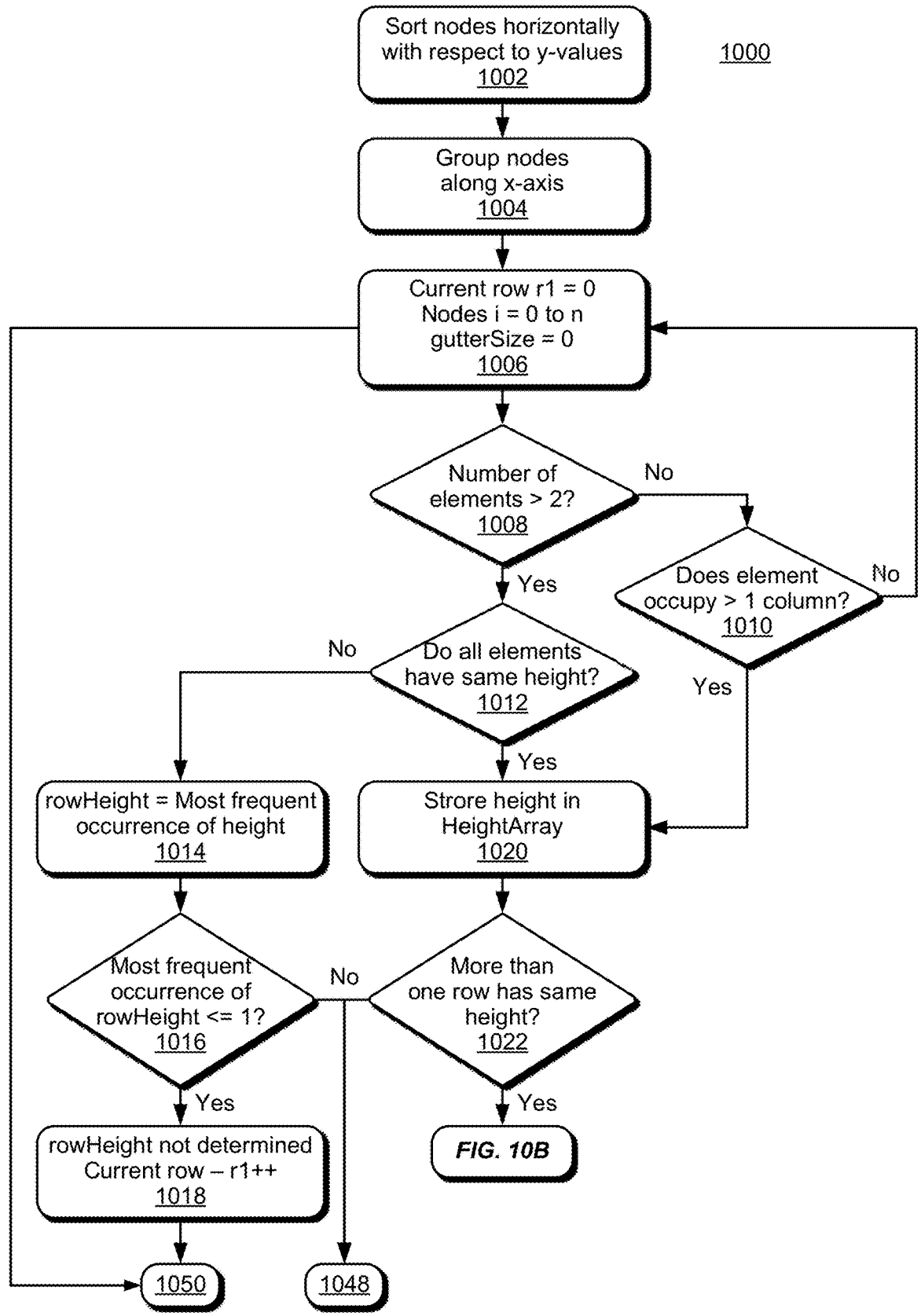
FIG. 10 encompasses FIGS. 10A-10D, and illustrates an example method of grid layout determination from a document image in accordance with one or more implementations.
Figure 10B:
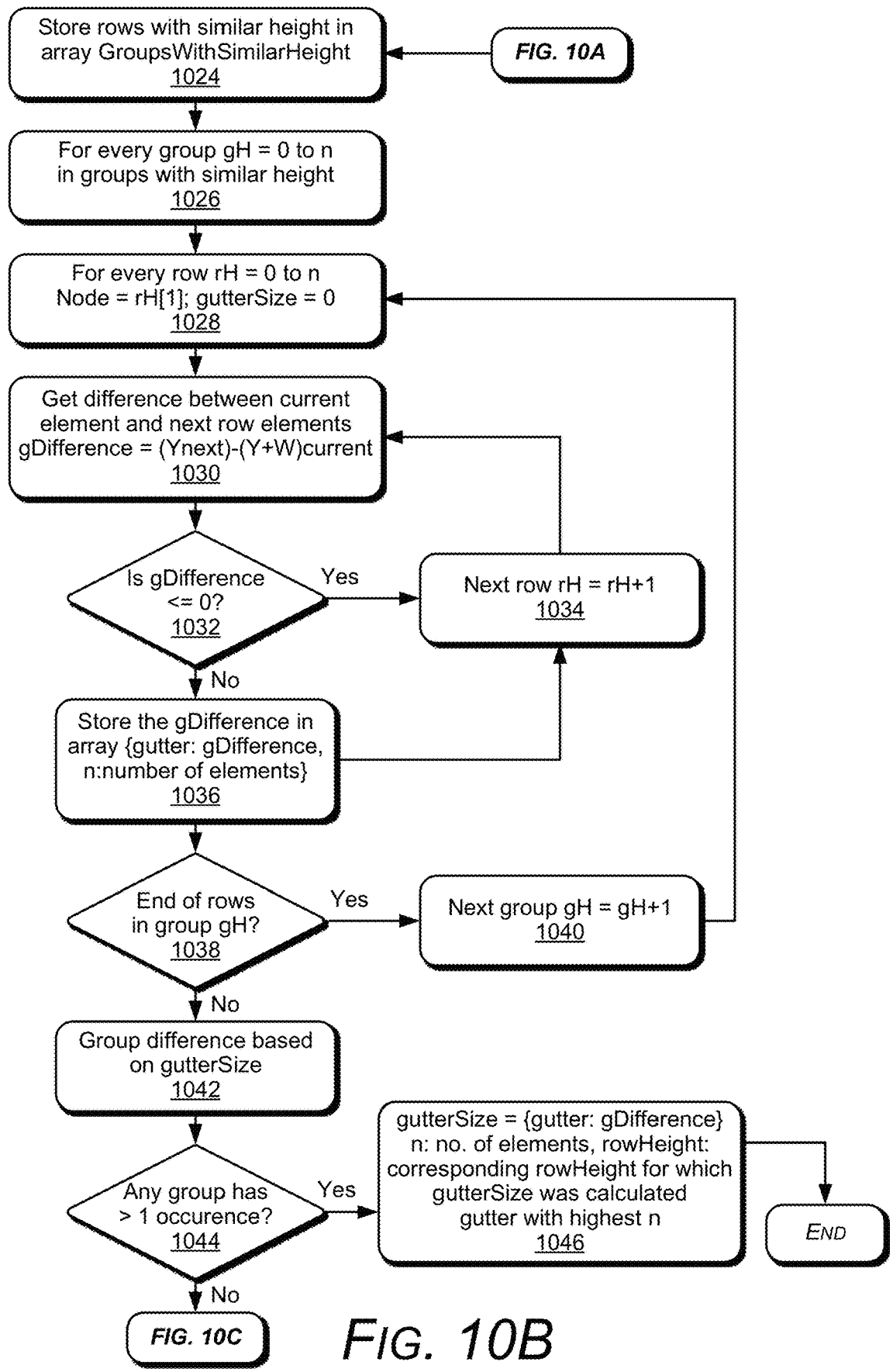
Figure 10C:
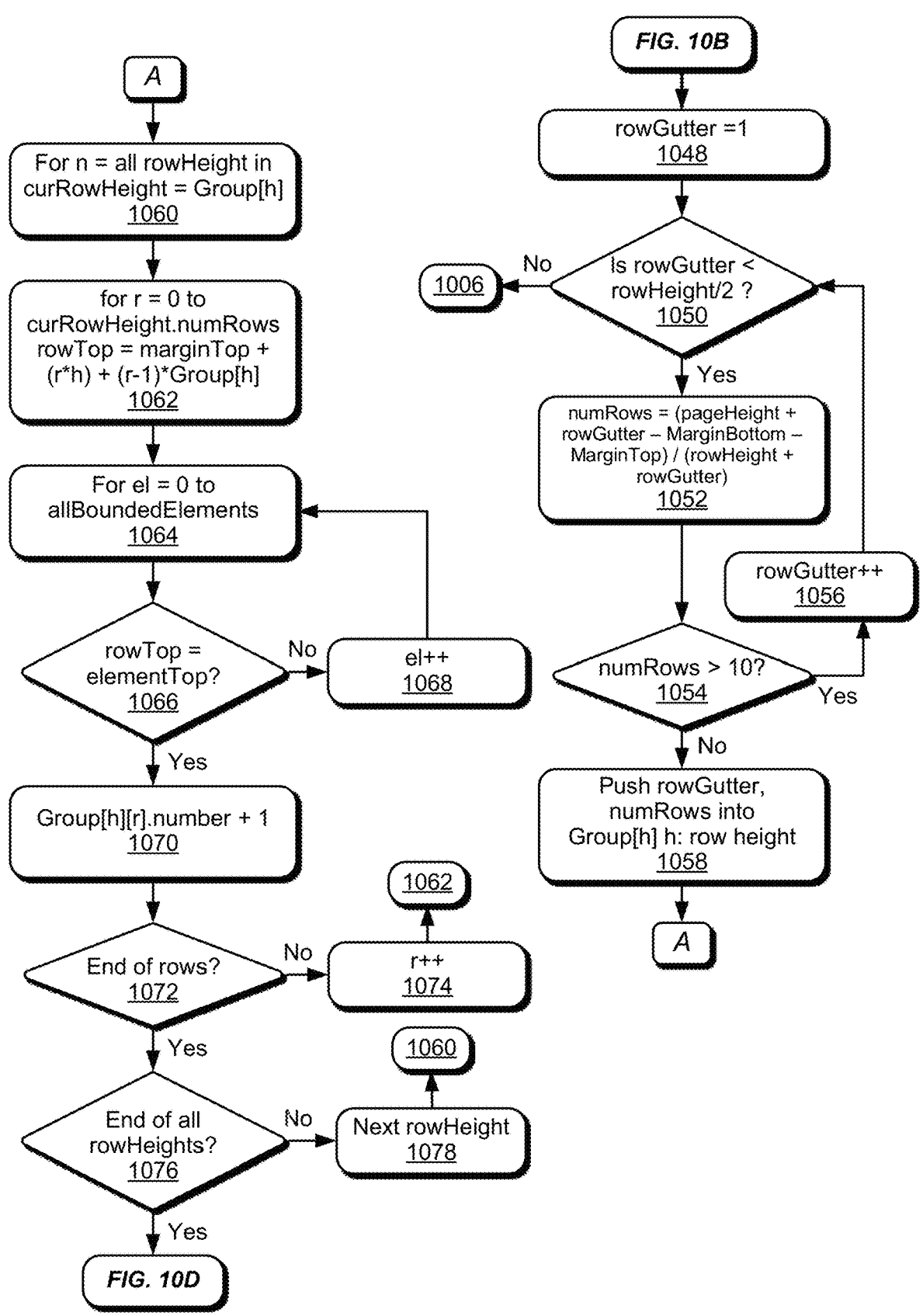
Figure 10D:
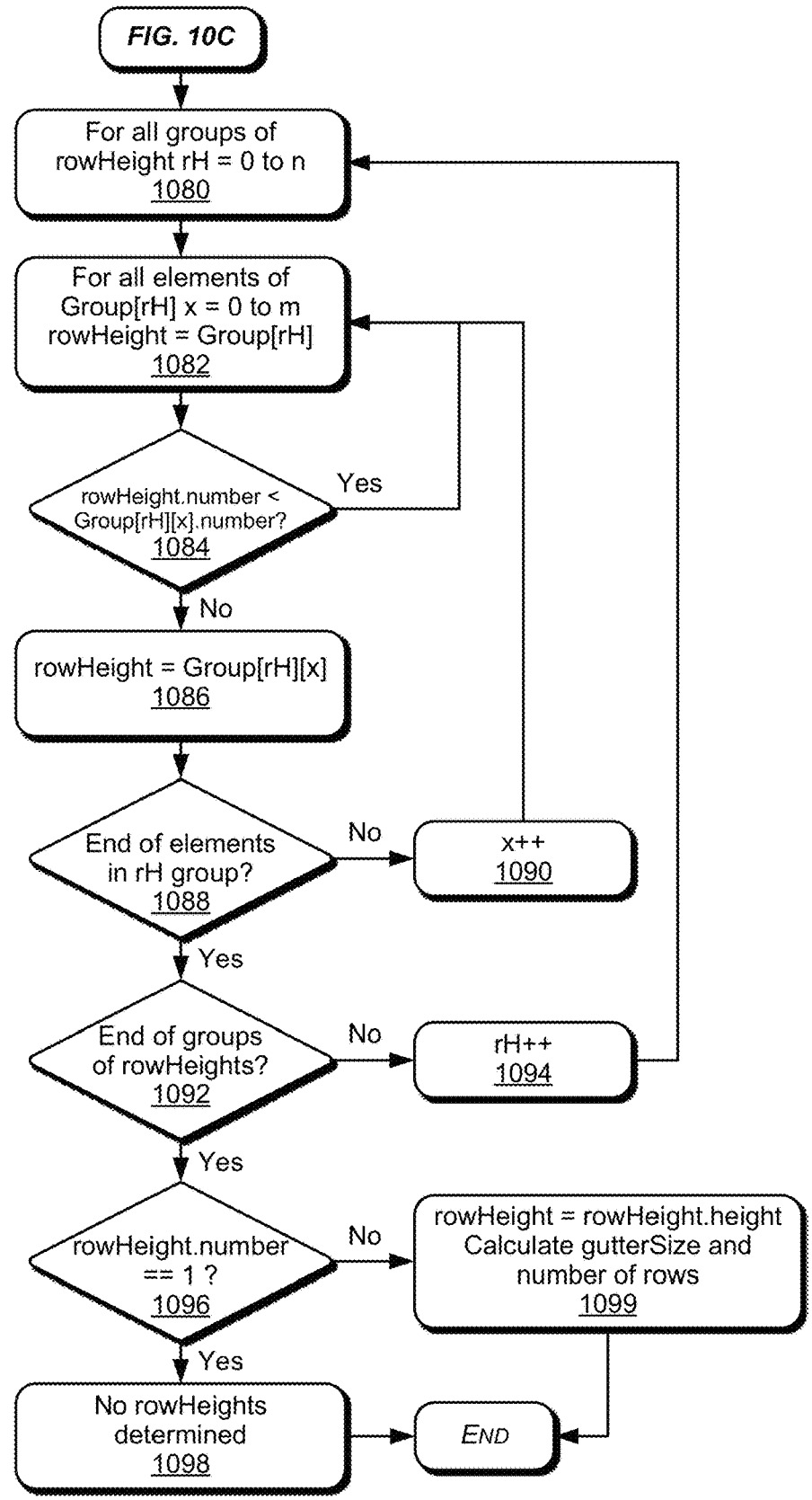

FIG. 9 encompasses FIGS. 9A-9C, which illustrate an example method 900 for grid layout determination from a document image, and is generally described with reference to calculating the column width of the columns for a grid layout by the grid layout system as described with reference to FIGS. 1-3. The order in which the method is described is not intended to be construed as a limitation, and any number or combination of the method operations can be combined in any order to implement a method, or an alternate method.

At 902, objects with similar widths are grouped, and at 904, a group is sorted based on the number of elements in descending order. For example, to calculate the column width 232, the column layout module 206 groups the nodes of the node tree 212 with similar widths using a clustering algorithm, such as K-means clustering into width-sets. The column layout module 206 then sorts width-set of the width-sets based on the number of elements to generate a set containing the most number of elements to the least number of elements.

At 906, the avgArr=[ ] with an index=0, and at 908, for every element in the group ArrGrp, i=0 to len. The avgArr is an array containing the average widths of each group. The index=index of ArrGrp Array.0 being the index of the group with the most number of elements. The ArrGrp is an array of groups with similar widths. The i=index of elements in an individual group of an AvgArr array. At 910, a determination is made as to whether the object is an image, in which case, the object is weighted more at 912 than if the object is not an image at 914. For example, a graphic (e.g., an image) is weighted more than the text for determining the column layout 226 and calculating the quantity of the columns 112 in the document. At 916, a determination is made as to whether the iterative process has reached the end of all elements in the group, and if not, i++ is incremented at 918 and the method continues at 910. Alternatively, if the iterative process has reached the end of all elements in the group (i.e., "Yes" from 916), then at 920, a determination is made as to whether the iterative process has reached the end of all groups, and if not index++ is incremented at 922 and the method continues at 908.

Alternatively, if the iterative process has reached the end of all groups (i.e., "Yes" from 920), then the process continues to determine the average width within each group of objects. For example, at 924, the value g=0 to ArrGrp.length, and at 926, the indGrp=ArrGrp[g], where avg=0 and for i=0 to indGrp.length. At 928, the {avg+=Wi×Wei} allWeights+=Wei. The indGrp is an individual array of the ArrGrp, and g is the index of ArrGrp. The avg is the average, and allWeights is the sum of all weights in an indGrp. The Wei is the weight of elements ei, and the Wi is the width of elements i.

At 930, a determination is made as to whether the iterative process has reached the end of the indGrp, in which case, i++ is incremented at 932 if the iterative process has not reached the end (i.e., "No" from 930), and the method continues at 928. Alternatively, if the iterative process has reached the end (i.e., "Yes" from 930), then at 934, {AvgArr [g]=avg/allWeights}. At 936, a determination is made as to whether the end of the iterative process has reached the end of the ArrGrp, in which case, g++ is incremented at 938 if the iterative process has not reached the end (i.e., "No" from 936), and the method continues at 926. Alternatively, if the iterative process has reached the end (i.e., "Yes" from 936), then the process continues to calculate the width of the columns, taking into consideration blocks that occupy multiple columns.

At 940, j=0 and the ColumnWidth=AvgArr[j]. At 942, k=j+1, where j is an index of the AvgArr.0 being the index of the group with the most number of elements, and k is the next element. At 944, a determination is made as to whether k=AvgArr length, in which case if it does, the process ends. Alternatively, if k does not equal the AvgArr length (i.e., "No" from 944), then at 946, a determination is made as to whether the curWidth is greater than the nextWidth, in which case if it is not, k++ increments at 948 and the method continues at 944. Alternatively, if the curWidth is greater than the nextWidth (i.e., "Yes" from 946), then at 950, the numOfCols=curWidth/nextWidth and numOfGutters=numOfCols−1. At 952, the absWidth=curWidth−(numOfGutters*gutterWidth), and proportion=absWidth/nextWidth.

At 954, a determination is made as to whether the proportion +/−x, in which case if it is not, then k++ increments at 956 and the method continues at 944. Alternatively, if the proportion +/−x (i.e., "Yes" from 954), then at 958, the ColumnWidth=AvgArr[k] and k++ increments. The method then continues at 944.

FIG. 10 encompasses FIGS. 10A-10D, which illustrate an example method 1000 for grid layout determination from a document image, and is generally described with reference to calculating the row layout of the rows for a grid layout by the grid layout system as described with reference to FIGS. 1-3. The order in which the method is described is not intended to be construed as a limitation, and any number or combination of the method operations can be combined in any order to implement a method, or an alternate method.

At 1002, the nodes are sorted horizontally with respect to y-values, and at 1004, the nodes are grouped along the x-axis. For example, the row layout module 208 of the grid layout system 110 sorts the nodes (e.g., the feature elements of a document image 106) horizontally by their respective y-position along a y-axis starting at the top of the document image. The row layout module 208 also groups the nodes with respect to the x-axis starting at the left of the document image 106 so that all of the feature elements at a particular x-axis are grouped together. This is similar in feature to the column layout module 206 of the grid layout system 110 that sorts and groups the nodes to develop the column layout of the columns for the grid layout.

At 1006, the current row r1=0, the nodes i=0 to n, and the gutterSize=0. For example, the row layout module 208 determines the spacing differences between each of the feature elements in the document image. At 1008, a determination is made as to whether the number of the elements is greater than two, and if not, another determination is made at 1010 as to whether an element occupies more than one column of the grid layout. If the element does not occupy more than one column (i.e., "No" from 1010), then the method continues at 1006. Alternatively, if the element does occupy more than one column (i.e., "Yes" from 1010), then at 1020, the height is stored in the heightArray. Similarly, if the number of the elements is greater than two (i.e., "Yes" from 1008), then at 1012, another determination is made as to whether all of the elements have the same height. If all of the elements have the same height (i.e., "Yes" from 1012), then similarly at 1020, the height is stored in the heightArray. Alternatively, if all of the elements do not have the same height (i.e., "No" from 1012), then at 1014, the rowHeight=the most frequent occurrence of height.

At 1016, a determination is made as to whether the most frequent occurrence of the rowHeight is <=1, in which case if it is not, the method continues at operation 1048 described below. Alternatively, if the most frequent occurrence of the rowHeight is <=1 (i.e., "Yes" from 1016), then at 1018, a rowHeight is not determined, the current row r1++ is incremented, and the method continues at 1006.

At 1022, a determination is made as to whether more than one row has the same height, as stored in the heightArray at 1020, in which case if it is not, the method also continues at operation 1048 described below. Alternatively, if more than one row does have the same height (i.e., "Yes" from 1022), then at 1024, the rows are stored in groups of rows with similar heights. At 1026, every group gH=0 to n in groups with similar height, and at 1028, every row rH=0 to n, node=rH[1], and gutterSize=0. At 1030, a spacing difference between the current element and the elements of a next row are determined, where the difference=($Y_{next}$) (Y+W). At 1032, a determination is made as to whether the difference is <=0, in which case if it is (i.e., "Yes" from 1032), then at 1034, the next row rH=rH+1, and the method continues at 1030. Alternatively, if the difference is not <=0 (i.e., "No" from 1032), then at 1036, the determined difference is stored in an array, where {gutter: gDifference, n: number of elements} in this example.

At 1038, a determination is made as to whether the iterative process has reached the end of rows in group gH. If the iterative process has reached the end of rows in the group gH (i.e., "Yes" from 1038), then at 1040, the next group gH=gH+1, and the method continues at 1028. Alternatively, if the iterative process has not reached the end of rows in the group gH (i.e., "No" from 1038), then at 1042, the group difference is based on the gutterSize. At 1044, a determination is made as to whether any group has >1 occurrence, in which case if a group does, then at 1046, the gutterSize={gutter: gDifference} {n: number of elements, rowHeight: corresponding rowHeight for which gutterSize was calculated} is the gutter with the highest n value. Alternatively, if a group does not have a >1 occurrence (i.e., "No" from 1044), then at 1048, the rowGutter=1. The row layout module 208 performs an iterative method where each element height is considered as a possible row height. All probable combinations of number of rows, number of gutters, and gutter size are stored and matched with the rest of the elements on the document page to find the best possible result.

At 1050, a determination is made as to whether the rowGutter<rowHeight/2, in which case if it is not, then the method continues at operation 1006. If the rowGutter is less than rowHeight/2 (i.e., "Yes" from 1050), then at 1052, the numRows=(pageHeight+rowGutter−marginBottom−marginTop)/(rowHeight+rowGutter). At 1054, a determination is made as to whether the numRows is >10, in which case if it is, rowGutter++ is incremented at 1056, and the method continues at operation 1050. Alternatively, if the numRows is not greater than 10 (i.e., "No" from 1054), then at 1058, the rowGutte, numRows is added to group[h] h: row height. At 1060, n=all rowHeight in curRowHeight=group[h], and at 1062, for r=0 to curRowHeight.numRows, the rowTop=marginTop+(r*h)+(r−1)*Group[h], and at 1064, el=0 to all bounded elements.

At 1066, a determination is made as to whether the rowTop=elementTop, in which case if it does not, then el++ is incremented at 1068, and the method continues at 1064. If the rowTop does equal elementTop (i.e., "Yes" from 1066), then at 1070, the group[h][r].number+=1. At 1072, a determination is made as to whether the iterative process has reached end of rows r, in which case if it has not, then r++ incremented at 1074, and the method continues at 1062. Alternatively, if the iterative process has reached end of rows r (i.e., "Yes" from 1072), then at 1076, a determination is made as to whether the iterative process has reached end of all rowHeights. If the iterative process has not reached the end of all rowHeights (i.e., "No" from 1076), then at 1078, next rowHeight and the method continues at 1060. Alternatively, if the iterative process has reached the end of all rowHeights (i.e., "Yes" from 1076), then at 1080, for all group of rowHeight, rH=0 to n.

At 1082, for all elements of group[rh], then x=0 to n, and rowHeight=group[rh]. At 1084, a determination is made as to whether the rowHeight.number<the group[rH][x].number, in which case if it is (i.e., "Yes" from 1084), the method continues at 1082. Alternatively, if the rowHeight.number is not less than the group[rH][x].number (i.e., "No" from 1084), then at 1086, the rowHeight=group [rH][x].

At 1088, a determination is made as to whether the iterative process has reached the end of elements in group of rH, in which case if it has not, x++ increments at 1090, and the method continues at 1082. If the iterative process has reached the end of the elements in the group of rH (i.e., "Yes" from 1088), then at 1092, a determination is made as to whether the iterative process has reached the end of groups of rowHeights, in which case if it has not, rH++ increments at 1094, and the method continues at 1080. If the iterative process has reached the end of groups of rowHeights (i.e., "Yes" from 1092), then at 1096, a determination is made as to whether the rowHeight.number=1, in which case if it does (i.e., "Yes" from 1096), then at 1098, no rowHeights are determined. Alternatively, if the rowHeight.number is not equal to 1 (i.e., "No" from 1096), then at 1099, the rowHeight=rowHeight.height and the row layout module 208 calculates the gutterSize and number of rows for the row layout 228 of the grid layout 108 of the document.

Figure 11:
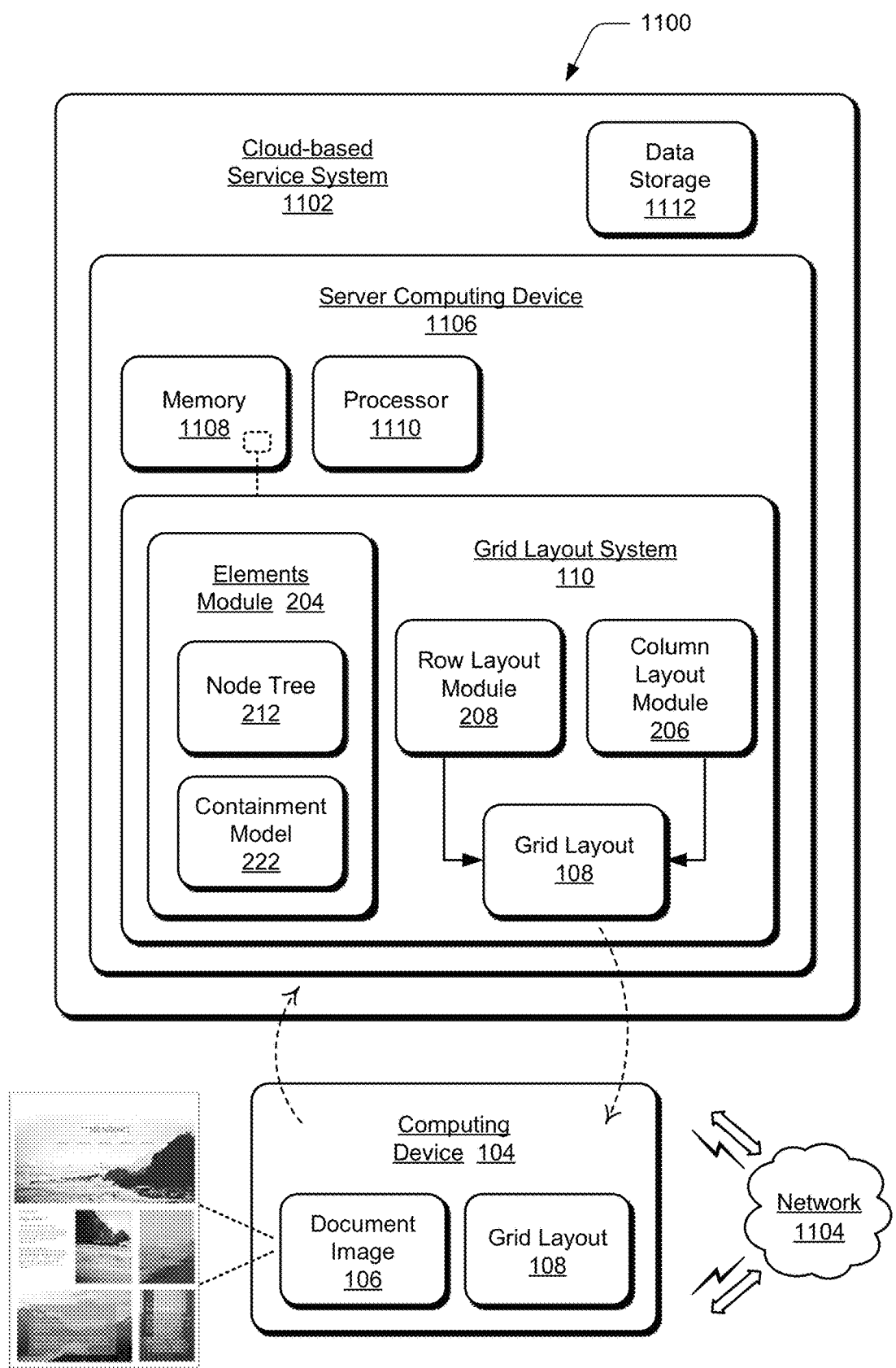
FIG. 11 illustrates an example implementation of a grid layout system at a cloud-based service system in accordance with one or more aspects of grid layout determination from a document image.

FIG. 11 illustrates an example implementation 1100 of features of the grid layout system 110 in which aspects of grid layout determination from a document image can be implemented. The example implementation 1100 includes the grid layout system 110 implemented at a cloud-based service system 1102, which is an image service that can be accessed on-line by the computing device 104. Generally, the cloud-based service system 1102 may be an overall asset service that can be accessed on-line, and can include one or more databases of digital images, graphics, videos, templates, grid layouts, and/or any other type of asset, such as may be made available on a subscription basis for user access.

Any of the devices, servers, and/or services described herein can communicate via a network 1104, such as for data communication between the grid layout system 110 at the cloud-based service system 1102 and the computing device 104. The network 1104 can be implemented to include a wired and/or a wireless network. The network can also be implemented using any type of network topology and/or communication protocol, and can be represented or otherwise implemented as a combination of two or more networks, to include IP-based networks and/or the Internet. The network 1104 may also include mobile operator networks that are managed by a mobile network operator and/or other network operators, such as a communication service provider, mobile phone provider, and/or Internet service provider.

The example implementation 1100 includes the cloud-based service system 1102, the computing device 104, and the network 1104 via which any of the devices, servers, and/or services described herein can communicate. The cloud-based service system 1102 includes a server computing device 1106, which is representative of one or more hardware server devices (e.g., computing devices) that may be implemented at the cloud-based service system. The server computing device 1106 includes memory 1108 and a processor 1110, and may include any number and combination of different components as further described with reference to the example device shown in FIG. 12. The cloud-based service system 1102 also includes data storage 1112 that may be implemented as any suitable memory, memory device, or electronic data storage for network-based data storage. The data storage 1112 can be utilized at the cloud-based service system 1102 to maintain an uploaded document image 106, as well as any of the data related to the grid layout determination.

As shown in this example implementation 1100, the server computing device 1106 implements the grid layout system 110, which includes the elements module 204, the column layout module 206, and the row layout module 208. The server computing device 1106 implements the grid layout system 110, such as in software, in hardware, or as a combination of software and hardware components. In this example, the grid layout system 110 is implemented as a software application or module, such as executable software instructions (e.g., computer-executable instructions) that are executable with a processing system (e.g., the processor 1110) of the server computing device 1106 to implement the techniques of grid layout determination from a document image. The grid layout system 110 can be stored on computer-readable storage media, such as any suitable memory device (e.g., the device memory 1108) or electronic data storage implemented in the server computing device 1106 and/or at the cloud-based service system 1102. The cloud-based service system 1102 may include multiple data storage, server devices, and applications, and can be implemented with various components as further described with reference to the example device shown in FIG. 12.

As described with reference to FIGS. 1-10, the grid layout system 110 can receive the document image 106 of the printed document 102 as an input to the elements module 204, which is implemented to determine the feature elements 210 of the document content in the document image. The elements module 204 can then generate the node tree 212 of the bounded elements 214 that represent relationships of the feature elements 210 in the document, where each of the bounded elements 214 is considered in the determination of the grid layout 108 of the rows and columns in the document.

The elements module 204 can then generate the containment model 222 that includes the node tree 212 of the bounded elements 214, and includes the size and position data 224 for each of the bounded elements 214 in the document. The column layout module 206 of the grid layout system 110 is implemented to determine the column layout 226 of the columns 112 for the grid layout 108 of the document based on the containment model 222, which includes calculating a quantity of the columns in the document. Similarly, the row layout module 208 of the grid layout system 110 is implemented to determine the row layout 228 of the rows 116 for the grid layout 108 of the document based on the containment model 222, which includes calculating a quantity of the rows in the document.

Figure 12:
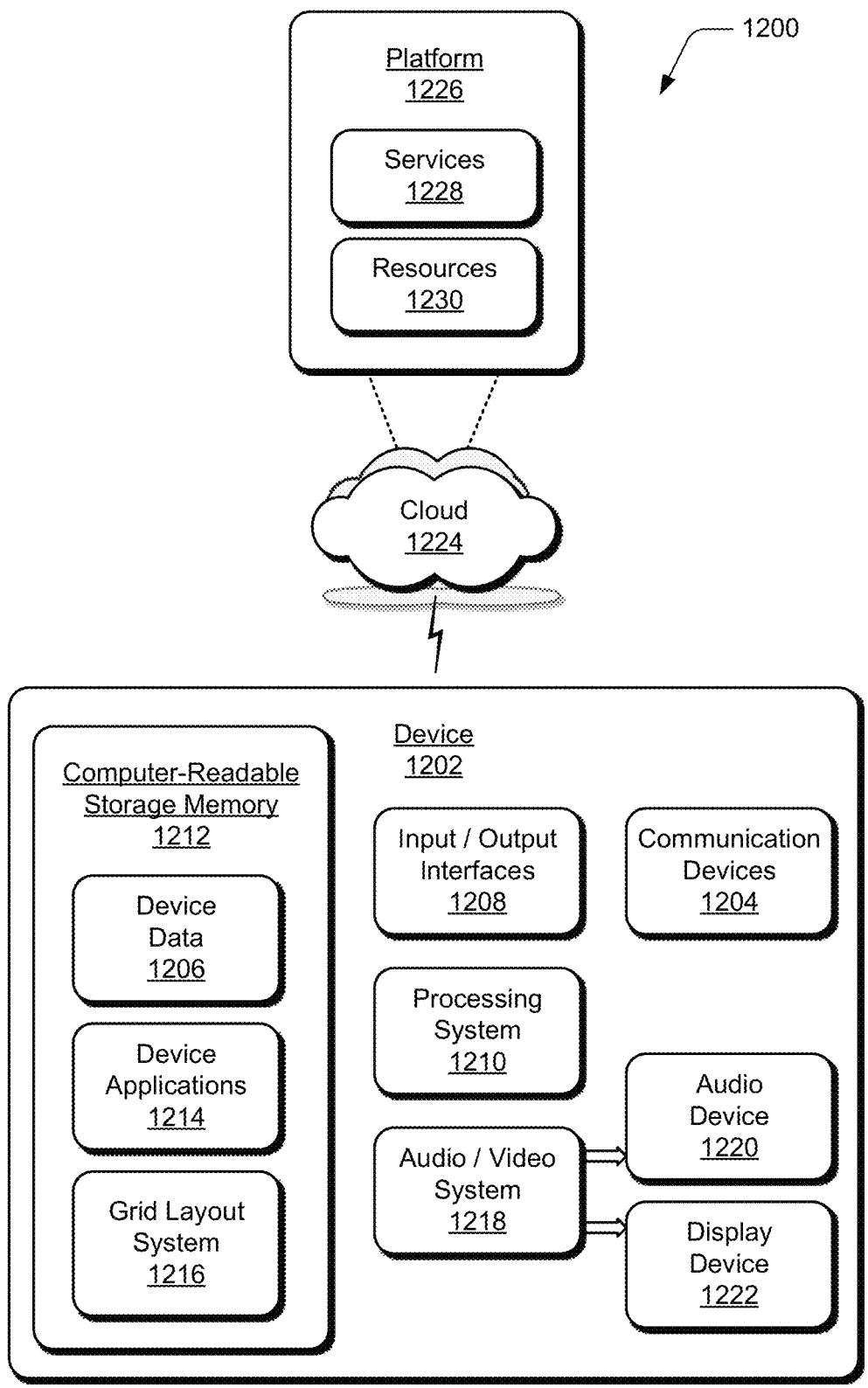
FIG. 12 illustrates an example system with an example device that can implement aspects of grid layout determination from a document image.

FIG. 12 illustrates an example system 1200 that includes an example device 1202, which can implement techniques of grid layout determination from a document image. The example device 1202 can be implemented as any of the computing devices, mobile devices, server devices, and/or services described with reference to the previous FIGS. 1-11, such as any type of computing device, client device, mobile phone, tablet, communication, entertainment, gaming, media playback, and/or other type of device. For example, the computing device 104, the server computing device 1106, and/or various server devices of the cloud-based service system 1102 may be implemented as the example device 1202.

The example device 1202 includes communication devices 1204 that enable wired and/or wireless communication of device data 1206, such as the document images and grid layout data that is communicated between the devices in a network, as well as computer applications data and content that is transferred from one computing device to another, and/or synched between multiple computing devices. The device data 1206 can include any type of audio, video, image, and/or graphic data that is generated by applications executing on the device. The communication devices 1204 can also include transceivers for cellular phone communication and/or for network data communication.

The device 1202 also includes input/output (I/O) interfaces 1208, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 1202. The I/O interfaces also include data input ports via which any type of data, media content, and/or inputs can be received, such as user inputs to the device, as well as any type of audio, video, and/or image data received from any content and/or data source.

The device 1202 includes a processing system 1210 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1202 may further include any type of a system bus or other data and command transfer system that couples the various components within the device. A system bus can include any one or combination of different bus structures and architectures, as well as control and data lines.

The example device 1202 also includes computer-readable storage memory 1212, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 1212 can include various implementations of random access memory (RAM), read-only memory (ROM), flash memory, and other types of storage memory in various memory device configurations.

The computer-readable storage memory 1212 provides storage of the device data 1206 and various device applications 1214, such as an operating system that is maintained as a software application with the computer-readable storage memory and executed by the processing system 1210. In this example, the device applications also include various computer applications and a grid layout system 1216 that implements the described techniques of grid layout determination from a document image, such as when the example device 1202 is implemented as the server computing device 1106 shown in FIG. 11. An example of the grid layout system 1216 includes the grid layout system 110 that is implemented by the computing device 104 and by the server computing device 1106, and/or various server devices of the cloud-based service system 1102, as described with reference to FIGS. 1-11.

The device 1202 also includes an audio and/or video system 1218 that generates audio data for an audio device 1220 and/or generates display data for a display device 1222. The audio device and/or the display device include any devices that process, display, and/or otherwise render audio, video, display, and/or image data. In implementations, the audio device and/or the display device are integrated components of the example device 1202. Alternatively, the audio device and/or the display device are external, peripheral components to the example device. In embodiments, at least part of the techniques described for grid layout determination from a document image may be implemented in a distributed system, such as over a "cloud" 1224 in a platform 1226. The cloud 1224 includes and/or is representative of the platform 1226 for services 1228 and/or resources 1230. For example, the services 1228 may include the cloud-based service system 1102 described with reference to FIG. 11.

The platform 1226 abstracts underlying functionality of hardware, such as server devices (e.g., included in the services 1228) and/or software resources (e.g., included as the resources 1230), and connects the example device 1202 with other devices, servers, etc. The resources 1230 may also include applications and/or data that can be utilized while computer processing is executed on servers that are remote from the example device 1202. Additionally, the services 1228 and/or the resources 1230 may facilitate subscriber network services, such as over the Internet, a cellular network, or Wi-Fi network. The platform 1226 may also serve to abstract and scale resources to service a demand for the resources 1230 that are implemented via the platform, such as in an interconnected device embodiment with functionality distributed throughout the system 1200. For example, the functionality may be implemented in part at the example device 1202 as well as via the platform 1226 that abstracts the functionality of the cloud 1224.

Although implementations of grid layout determination from a document image have been described in language specific to features and/or methods, the appended claims are not necessarily limited to the specific features or methods described. Rather, the specific features and methods are disclosed as example implementations of grid layout determination from a document image, and other equivalent features and methods are intended to be within the scope of the appended claims. Further, various different examples are described and it is to be appreciated that each described example can be implemented independently or in connection with one or more other described examples.

The invention claimed is:

1. In a digital medium environment for determining a grid layout from a document image, a method implemented by at least one computing device, the method comprising:
    receiving the document image of a document that includes document content, the document image captured as a digital image of the document with a camera device;

determining the grid layout of rows and columns in the document from the document image, the determining of the grid layout comprising:
   determining feature elements of the document content in the document;
   generating a containment model from a node tree of bounded elements that represent relationships of the feature elements in the document, the containment model including size and position data for each of the bounded elements in the document;
   determining a column layout of the columns in the document based on the containment model, the determining the column layout including calculating a quantity of the columns in the document based in part on a graphic being weighted more than text; and
   determining a row layout of the rows in the document based on the containment model, the determining the row layout including calculating a quantity of the rows in the document based in part on the graphic being weighted more than the text.

2. The method as recited in claim 1, wherein the determining the column layout comprises:
   calculating a horizontal space width between the columns;
   calculating a column width of each of the columns;
   calculating left and right margins of the document; and
   said calculating the quantity of the columns in the document based on the horizontal space width, the column width, and the left and right margins.

3. The method as recited in claim 1, wherein the determining the row layout comprises:
   calculating a vertical space height between the rows;
   calculating a row height of each of the rows;
   calculating top and bottom margins of the document; and
   said calculating the quantity of the rows in the document based on the vertical space height, the row height, and the top and bottom margins.

4. The method as recited in claim 1, wherein the document content includes the feature elements as one or more of the text and graphics.

5. The method as recited in claim 1, wherein at least one of the bounded elements represents a feature element of the document encompassed by another of the feature elements, the encompassed feature element being disregarded in the generation of the containment model.

6. The method as recited in claim 1, wherein the containment model represents an organization of the bounded elements in the node tree from which the column layout of the columns is determined and from which the row layout of the rows is determined.

7. A computing device implemented to determine a grid layout from a document image, the computing device comprising:
   a memory to maintain the document image of the document, as well as the grid layout of rows and columns in the document, the document image captured as a digital image of the document with a camera device;
   a processor system configured to execute a grid layout system implemented to perform operations comprising to:
      determine feature elements of document content in the document, the feature elements including one or more of text and graphics;
      generate a containment model from a node tree of bounded elements that represent relationships of the feature elements in the document, the containment model including size and position data for each of the bounded elements in the document; and
      determine a column layout of the columns in the document and a row layout of the rows in the document based on the containment model and based in part on a graphic being weighted more than the text.

8. The computing device as recited in claim 7, wherein the grid layout system is implemented to:
   calculate a quantity of the columns in the document to determine the column layout of the columns; and
   calculate a quantity of the rows in the document to determine the row layout of the rows.

9. The computing device as recited in claim 8, wherein the grid layout system is implemented to calculate the quantity of the columns in the document based on a horizontal space width between the columns, a column width of each of the columns, and left and right margins of the document.

10. The computing device as recited in claim 8, wherein the grid layout system is implemented to calculate a quantity of the rows in the document based on a vertical space height between the rows, a row height of each of the rows, and top and bottom margins of the document.

11. The computing device as recited in claim 7, wherein at least one of the bounded elements represents a feature element of the document encompassed by another of the feature elements, the encompassed feature element being disregarded in the generation of the containment model.

12. The computing device as recited in claim 7, wherein the containment model represents an organization of the bounded elements in the node tree from which the column layout of the columns is determined and from which the row layout of the rows is determined.

13. A system for determining a grid layout from a document image, the system comprising:
   means for storing the document image of a document, the document image captured as a digital image of the document with a camera device;
   means for determining the grid layout of rows and columns in the document, the means for determining the grid layout comprising means for:
      determining feature elements of document content in the document, the feature elements including one or more of text and graphics;
      generating a containment model from a node tree of bounded elements that represent relationships of the feature elements in the document, the containment model representing an organization of the bounded elements in the node tree; and
      determining a column layout of the columns in the document and a row layout of the rows in the document based on the containment model and based in part on a graphic being weighted more than the text.

14. The system as recited in claim 13, further comprising means for:
   calculating a quantity of the columns in the document to determine the column layout of the columns; and
   calculating a quantity of the rows in the document to determine the row layout of the rows.

15. The system as recited in claim 14, wherein the quantity of the columns in the document is calculated based on a horizontal space width between the columns, a column width of each of the columns, and left and right margins of the document.

16. The system as recited in claim 14, wherein the quantity of the rows in the document is calculated based on a vertical space height between the rows, a row height of each of the rows, and top and bottom margins of the document.

17. The system as recited in claim 13, wherein the containment model includes size and position data for each of the bounded elements in the document.

18. The system as recited in claim 13, wherein at least one of the bounded elements represents a feature element of the document encompassed by another of the feature elements, the encompassed feature element being disregarded in the generation of the containment model.

* * * * *